United States Patent
Ide et al.

(10) Patent No.: US 9,438,871 B2
(45) Date of Patent: Sep. 6, 2016

(54) LASER PROJECTION APPARATUS WITH BUNDLED FIBERS

(71) Applicant: CITIZEN HOLDINGS CO., LTD., Tokyo (JP)

(72) Inventors: Masafumi Ide, Saitama (JP); Shinpei Fukaya, Saitama (JP); Masaya Suzuki, Saitama (JP)

(73) Assignee: CITIZEN HOLDINGS CO., LTD., Tokyo (JP)

( * ) Notice: Subject to any disclaimer, the term of this patent is extended or adjusted under 35 U.S.C. 154(b) by 0 days.

(21) Appl. No.: 14/387,839

(22) PCT Filed: Dec. 26, 2013

(86) PCT No.: PCT/JP2013/084917
§ 371 (c)(1),
(2) Date: Sep. 24, 2014

(87) PCT Pub. No.: WO2014/104203
PCT Pub. Date: Jul. 3, 2014

(65) Prior Publication Data
US 2015/0036105 A1    Feb. 5, 2015

(30) Foreign Application Priority Data

Dec. 26, 2012  (JP) ................................ 2012-283356
Mar. 28, 2013  (JP) ................................ 2013-070333

(51) Int. Cl.
*H04N 9/31*    (2006.01)
*H04N 3/08*    (2006.01)
(Continued)

(52) U.S. Cl.
CPC ............ *H04N 9/3185* (2013.01); *G01S 17/08* (2013.01); *G01S 17/46* (2013.01); *H04N 3/08* (2013.01);
(Continued)

(58) Field of Classification Search
CPC ............ H04N 9/3129; H04N 9/3132; H04N 9/3135; H04N 9/3138; H04N 9/3185; H04N 3/22; G02B 6/065
See application file for complete search history.

(56) References Cited

U.S. PATENT DOCUMENTS 6,249,381 B1   6/2001 Suganuma
7,102,700 B1 * 9/2006 Pease et al. .................. 348/744
(Continued)

FOREIGN PATENT DOCUMENTS

JP   H05-193400 A   8/1993
JP   H09-508476 A   8/1997
(Continued)

OTHER PUBLICATIONS

International Search Report for PCT/JP2013/084917, Jan. 28, 2014.
(Continued)

*Primary Examiner* — Bao-Luan Le

(57) ABSTRACT

Provided is a projection apparatus that can enhance the efficiency of utilization of RGB laser lights, eliminate positional displacement in projection point caused by spaced-apart fiber cores emitting the laser lights, and detect additional information while projecting an image with the laser lights. The projection apparatus includes a laser light source emitting infrared and RGB laser lights, a fixing device fixing end portions of an infrared-light fiber and colored-light fibers used to transmit the infrared and RGB laser lights, a scanning unit projecting an image on a projection surface by scanning the projection surface with the RGB laser lights emitted from the end portions of the colored-light fibers, a detection unit detecting reflection of the infrared laser light emitted from the end portion of the infrared-light fiber, and a control unit controlling emission of the RGB laser lights from the light source, based on information detected by the detection unit.

4 Claims, 13 Drawing Sheets

(51) Int. Cl.
*G01S 17/08* (2006.01)
*G01S 17/46* (2006.01)
*H04N 3/22* (2006.01)
*G02B 6/06* (2006.01)
*G01S 17/89* (2006.01)

(52) U.S. Cl.
CPC ............ *H04N 9/317* (2013.01); *H04N 9/3129* (2013.01); *H04N 9/3132* (2013.01); *H04N 9/3135* (2013.01); *H04N 9/3138* (2013.01); *G01S 17/89* (2013.01); *G02B 6/065* (2013.01); *H04N 3/22* (2013.01)

(56) References Cited

U.S. PATENT DOCUMENTS

| | | | |
|---|---|---|---|
| 7,142,257 B2* | 11/2006 | Callison et al. | 348/744 |
| 8,098,414 B2* | 1/2012 | Nojima | 359/202.1 |
| 8,197,066 B2* | 6/2012 | Nagashima et al. | 353/20 |
| 8,622,549 B2* | 1/2014 | Linden | G02B 27/283 353/20 |
| 8,654,264 B2* | 2/2014 | Callison et al. | 348/744 |
| 2002/0180869 A1* | 12/2002 | Callison et al. | 348/203 |
| 2003/0001175 A1 | 1/2003 | Masuoka et al. | |
| 2007/0085936 A1* | 4/2007 | Callison et al. | 348/744 |
| 2007/0109451 A1* | 5/2007 | Pease et al. | 348/744 |
| 2009/0128717 A1* | 5/2009 | Nagashima et al. | 348/756 |
| 2009/0141192 A1* | 6/2009 | Nojima | 348/745 |
| 2010/0188644 A1* | 7/2010 | Kraenert et al. | 353/99 |
| 2010/0245780 A1* | 9/2010 | Abe et al. | 353/85 |
| 2010/0253769 A1* | 10/2010 | Coppeta et al. | 348/58 |
| 2010/0315605 A1* | 12/2010 | Arita | 353/98 |
| 2011/0216286 A1 | 9/2011 | Matsumoto et al. | |
| 2012/0315018 A1 | 12/2012 | Gohshi et al. | |
| 2013/0003021 A1* | 1/2013 | Linden | G02B 27/283 353/20 |

FOREIGN PATENT DOCUMENTS

| | | |
|---|---|---|
| JP | H11-326826 A | 11/1999 |
| JP | 03-021800 A | 1/2003 |
| JP | 2006-047977 A | 2/2006 |
| JP | 2006-186243 A | 7/2006 |
| JP | 2008-015001 A | 1/2008 |
| JP | 2008-039602 A | 2/2008 |
| JP | 2008-216506 A | 9/2008 |
| JP | 2009-047926 A | 3/2009 |
| JP | 2009-222973 A | 10/2009 |
| JP | 2010-085819 A | 4/2010 |
| JP | 2010-152323 A | 7/2010 |
| JP | 2011-242476 A | 12/2011 |
| JP | 2012-022176 A | 2/2012 |
| WO | 95/20811 A1 | 8/1995 |
| WO | 2006/001235 A1 | 1/2006 |
| WO | 2011/105546 A1 | 9/2011 |

OTHER PUBLICATIONS

B.T.Schowengerdt, et al., "Near-to-Eye Display using Scanning Fiber Display Engine," SID Int. Symp. Digest Tech. Papers, vol. 41, p. 848-851, May 2010.

H.Urey, et al., "Optical Performance Requirements for MEMS-Scanner Based Microdisplays," Proc. SPIE, vol. 4178, p. 176-185, Sep. 2000.

B.T.Schowengerdt, et al., "3D Displays using Scanning Laser Projetion," SID Int. Symp. DIgest Tech. Papers, vol. 43, p. 640-643, Jun. 2012.

JPO, Japanese Office Action for Japanese Patent Application No. 2014-514265, May 27, 2014.

Written Opinion of the International Searching Authority for PCT/JP2013/084917, Jan. 28, 2014.

* cited by examiner (A)

(B)

(A)

(B)

(C)

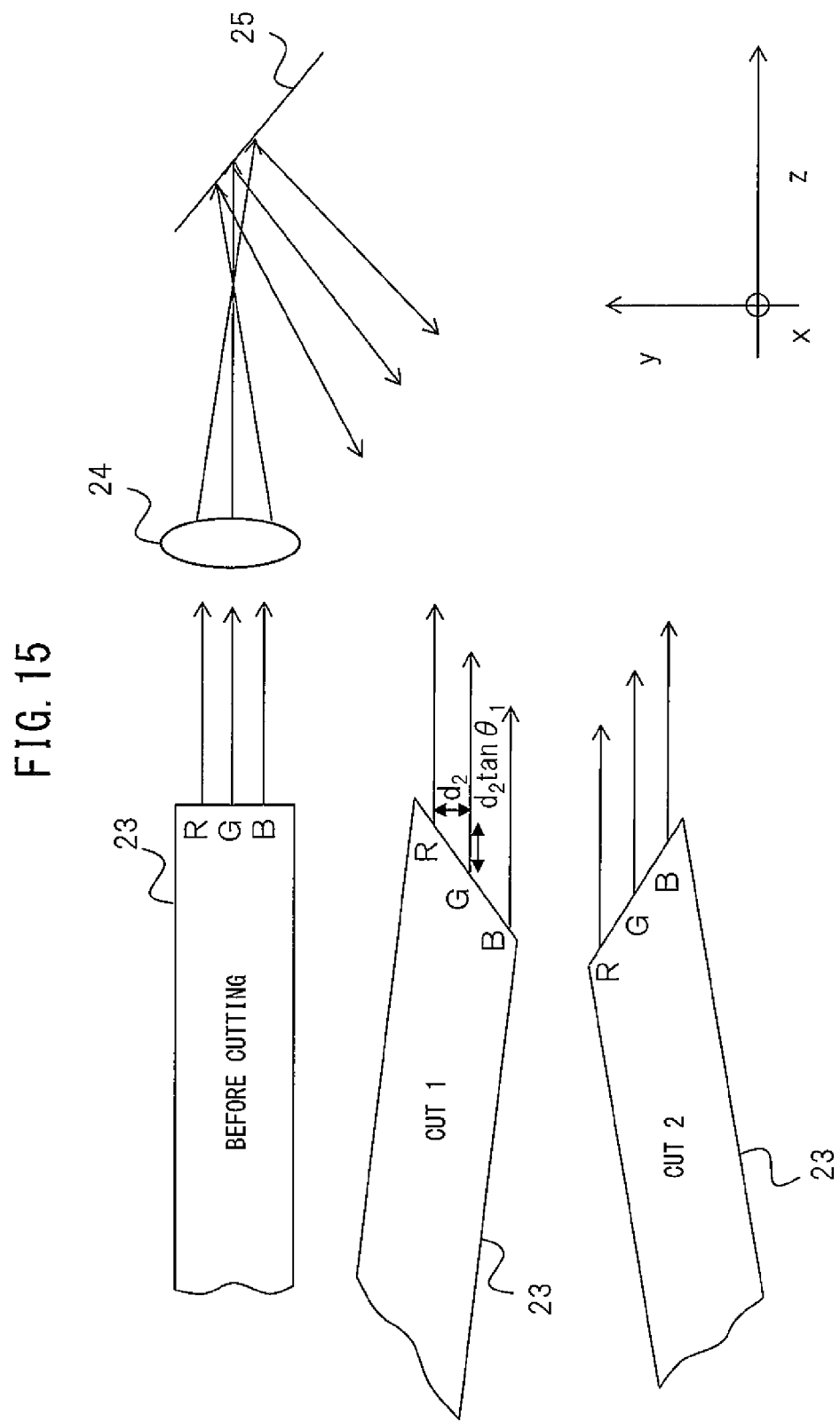

LASER PROJECTION APPARATUS WITH BUNDLED FIBERS

TECHNICAL FIELD

The present invention relates to a projection apparatus for projecting an image on a projecting surface by scanning laser light across the surface.

BACKGROUND ART

It is known to provide a laser projector that produces any desired color by combining, using a fused fiber combiner, the pigtails of fibers used to transmit laser lights of three primary colors red (R), green (G), and blue (B), respectively. It is also known to provide a light source apparatus that does not use such a fused fiber combiner but uses a fiber bundle fastened and fixed together by means of a ferrule.

Patent document 1 discloses a light source apparatus that includes a plurality of core/clad type optical fibers which are brought closer to each other and bundled together in parallel fashion by reducing the outer clad diameter of each optical fiber toward one end thereof while retaining its core diameter, and an optical unit which optically couples the other end of each of the optical fibers to a corresponding one of RGB laser light sources.

Patent document 2 discloses a projector that includes a light source apparatus which includes a ferrule fixing mechanism for fixedly holding a plurality of first optical fibers into which lights emitted from a plurality of light-emitting devices are introduced and a plurality of second optical fibers each of whose one end is connected to a combiner for combining the lights, an optical scanner which forms an image by scanning the light from the light source apparatus in a two-dimensional manner, and a focusing optical system which focuses the light scanned by the optical scanner onto a certain projection surface.

Patent document 3 discloses an optical scanning color projector apparatus in which laser beams emitted from R, G, and B semiconductor lasers are each converged by a converging lens and deflected by a movable mirror to draw a two-dimensional image on a screen. This apparatus displays a high-resolution color image by providing a time difference to the lighting timing of each laser beam so that when each laser beam arrives at the same pixel position, the laser beam will light with image information corresponding to that pixel.

Patent document 4 discloses an image display apparatus that can stabilize the resonant frequency of a scanning means, and thus produce a high-quality image. This image display apparatus includes a light source apparatus for emitting light, a scanning means for scanning the light emitted from the light source apparatus so as to project the light toward a projection surface, a second light source apparatus for projecting light onto the scanning means, and a control means for controlling the amount of light to be projected from the second light source apparatus so that the amount of heat absorbed by the scanning means is maintained constant.

Patent document 5 discloses a projection-type display apparatus that includes a plurality of light sources for emitting light modulated in accordance with an image signal, a collimator lens for converting the light from the plurality of light sources into parallel beams of rays, a converging lens system for converging the converted parallel beams of rays onto substantially the same optical axis by bringing the beams closer together, and an optical scanning means for causing the light converged onto substantially the same optical axis to be reflected by a variable angle mirror and thereby scanning the light across a projection surface in a two-dimensional manner.

PRIOR ART DOCUMENT

Patent Document

Patent Document 1: Japanese Unexamined Patent Publication No. 2008-216506
Patent Document 2: Japanese Unexamined Patent Publication No. 2011-242476
Patent Document 3: Japanese Unexamined Patent Publication No. 2006-186243
Patent Document 4: Japanese Unexamined Patent Publication No. 2008-015001
Patent Document 5: Japanese Unexamined Patent Publication No. 2010-085819

SUMMARY OF INVENTION

In the case of the laser projector that uses a fused fiber combiner, the distance between adjacent fiber cores is reduced in the fused fiber section. In the region where the core-to-core distance is reduced, optical coupling occurs between the optical fibers. Theoretically, it is possible to combine the light at the desired wavelength and to couple most of the light into the output fiber, if the coupling length between adjacent cores can be adjusted to the desired value. However, with the fused fiber method, it is generally difficult to control the coupling length with high accuracy. As a result, unintended crosstalk, etc., may occur between the adjacent cores, causing leakage of the light to be combined at the output and thus reducing the efficiency of light utilization. On the other hand, in the case where a fiber bundle is used rather than a fused fiber combiner, if the fibers are simply bundled using a ferrule, the projected image will appear blurred. This is because the projection points of the RGB laser lights become displaced relative to each other, since the fiber cores for the RGB laser lights are spaced a certain distance apart from each other.

Further, if the scanning unit for scanning the RGB laser lights in a two-dimensional manner is constructed, for example, from a resonant MEMS (Micro Electro Mechanical System) scanner, the projected image may be distorted as the resonant frequency varies due to variations in the temperature of the MEMS scanner. One possible method to eliminate such image distortion would be to project, for example, a checkerboard pattern or the like with visible light and to correct the projected image so as to cancel out the distortion of the checkerboard pattern occurring on the projection surface. However, if the correction is to be made using visible RGB lights, it is not possible to measure the image distortion while at the same time projecting the image to be displayed, and thus it is difficult to correct distortion of the projected image in real time.

If it is desired, for example, to project an image constantly in the same size regardless of the distance between the projection apparatus and the projection surface, it becomes necessary to control, for example, the scanning angles of the RGB laser lights by using depth information that indicates the distance. The depth information can be detected using visible light, but if visible light is used, there arises a problem in that the depth information cannot be detected unless an image is projected. On the other hand, if infrared light is used to detect the depth information, it is difficult to reduce the size and cost of the apparatus, because a depth sensor usually has to be provided separately from the projection apparatus.

Accordingly, an object of the present invention is to provide a projection apparatus that can enhance the efficiency of utilization of RGB laser lights while eliminating any positional displacement in projection point occurring due to the spaced-apart arrangement of the fiber cores for emitting the respective laser lights, and that can detect additional information such as image distortion or depth information while projecting an image with the RGB laser lights.

Provided is a projection apparatus including a laser light source which outputs red, green, and blue laser lights, a fixing device which fixes colored light radiating fibers including a red light fiber, a green light fiber, and a blue light fiber used to transmit the red, green, and blue laser lights, respectively, a scanning unit which projects an image on a projection surface by scanning the projection surface with the red, green, and blue laser lights, and an optical system which focuses light scanned by the scanning unit onto the projection surface, wherein the fixing device fixes the red light fiber, the green light fiber, and the blue light fiber so that projection points of the red, green, and blue laser lights will be aligned in order along a scanning direction of the scanning unit.

Preferably, the above projection apparatus further includes a detection unit which detects depth information indicating a distance from exit points of the laser lights to the projection surface, and a control unit which controls emission timing of the red, green, and blue laser lights in accordance with the depth information so as to cancel out positional displacement occurring between the projection points of the red, green, and blue laser lights on the projection surface due to a positional relationship between the colored light radiating fibers.

Provided is a projection apparatus including a laser light source which emits a plurality of laser lights having colors different from each other and having exit points on the same surface, a scanning unit which projects an image on a projection surface by scanning the projection surface with the plurality of laser lights, an optical system which focuses light scanned by the scanning unit onto the projection surface, and a control unit which controls emission timing of the plurality of laser lights emitted from the laser light source, on the basis of a distance between projection points of the plurality of laser lights on the projection surface and a direction of positional displacement occurring between the projection points relative to a scanning direction of the scanning unit, so as to cancel out the positional displacement.

Preferably, the above projection apparatus further includes a detection unit which detects depth information indicating a distance from the exit points of the plurality of laser lights to the projection surface, and the control unit controls the emission timing based on the depth information.

Preferably, in the above projection apparatus, the laser light source emits at least red, green, and blue laser lights as the plurality of laser lights so that projection points of the red, green, and blue laser lights will be aligned along the scanning direction on the projection surface.

Preferably, in the above projection apparatus, the laser light source emits the red, green, and blue laser lights from a red light fiber, a green light fiber, and a blue light fiber, respectively, and the projection apparatus further includes a fixing device which fixes the red light fiber, the green light fiber, and the blue light fiber so that the projection points of the red, green, and blue laser lights will be aligned along the scanning direction.

Preferably, in the above projection apparatus, the fixing device further fixes an infrared light radiating fiber that outputs infrared light for detecting the depth information, together with the red light fiber, the green light fiber, and the blue light fiber.

Provided is a projection apparatus including a laser light source which emits infrared laser light, and red, green, and blue laser lights, a fixing device which fixes an exit end portion of an infrared light radiating fiber used to transmit the infrared laser light and exit end portions of colored light radiating fibers used to transmit the red, green, and blue laser lights, respectively, a scanning unit which projects an image on a projection surface by scanning the projection surface with the red, green, and blue laser lights emitted from the exit end portions of the colored light radiating fibers, a detection unit which detects a reflected light of the infrared laser light emitted from the exit end portion of the infrared light radiating fiber, and a control unit which controls emission of the red, green, and blue laser lights from the laser light source, based on information detected by the detection unit.

Preferably, in the above projection apparatus, the detection unit detects depth information which indicates a distance from the exit end portions of the colored light radiating fibers to the projection surface, and the control unit controls the emission based on the depth information.

Preferably, in the above projection apparatus, the control unit controls the emission based on an amount of positional displacement occurring between projection points of the red, green, and blue laser lights on the projection surface due to a positional relationship between the colored light radiating fibers fixed by the fixing device.

Preferably, in the above projection apparatus, the fixing device fixes the exit end portions of the colored light radiating fibers so that projection points of the red, green, and blue laser lights will be aligned along a scanning direction of the scanning unit.

Preferably, in the above projection apparatus, the fixing device fixes, together with the infrared light radiating fiber and the colored light radiating fibers, an end portion of an infrared light receiving fiber used to receive the reflected light and to transmit the reflected light therethrough, and the detection unit detects the depth information from the light transmitted through the infrared light receiving fiber.

Preferably, in the above projection apparatus, the fixing device fixes the colored light radiating fibers whose exit end faces are inclined at an angle with respect to a plane perpendicular to a longitudinal direction, and the scanning unit scans the projection surface with the laser lights emitted from the colored light radiating fibers in a direction inclined at an angle with respect to the longitudinal direction.

Preferably, in the above projection apparatus, the scanning unit is a MEMS scanner which scans the projection surface with the red, green, and blue laser lights in a two-dimensional manner, the projection apparatus further includes a projection lens which shapes the red, green, and blue laser lights emitted from the exit end portions of the colored light radiating fibers so that the laser lights will be projected onto the MEMS scanner, and the MEMS scanner is located away from the projection lens by the focal distance of the projection lens.

Preferably, in the above projection apparatus, the scanning unit projects an image of the red, green, and blue laser lights and an image of the infrared laser light one over the other on the projection surface, the detection unit is an infrared camera which captures the image projected onto the projection surface, and the control unit detects distortion of the image projected onto the projection surface based on an image captured by the infrared camera, and controls the emission by using image data that is corrected so as to cancel out the distortion.

Preferably, in the above projection apparatus, the detection unit further includes a band-pass filter which is placed in front of a capturing unit and transmits light within a wavelength band of the red, green, and blue laser lights and the infrared laser light.

The above projection apparatus can enhance the efficiency of utilization of RGB laser lights while eliminating any positional displacement in projection point occurring due to the spaced-apart arrangement of the fiber cores for emitting the respective laser lights, and can detect additional information such as image distortion or depth information while projecting an image with the RGB laser lights.

BRIEF DESCRIPTION OF DRAWINGS

FIG. 15 is a diagram for explaining a preferable cutting direction of the exit end faces.

DESCRIPTION OF EMBODIMENTS

Hereinafter, with reference to the drawings, a projection apparatus will be explained in detail. However, it should be noted that the technical scope of the present invention is not limited to embodiments thereof, and includes the invention described in claims and equivalents thereof.

Figure 1:
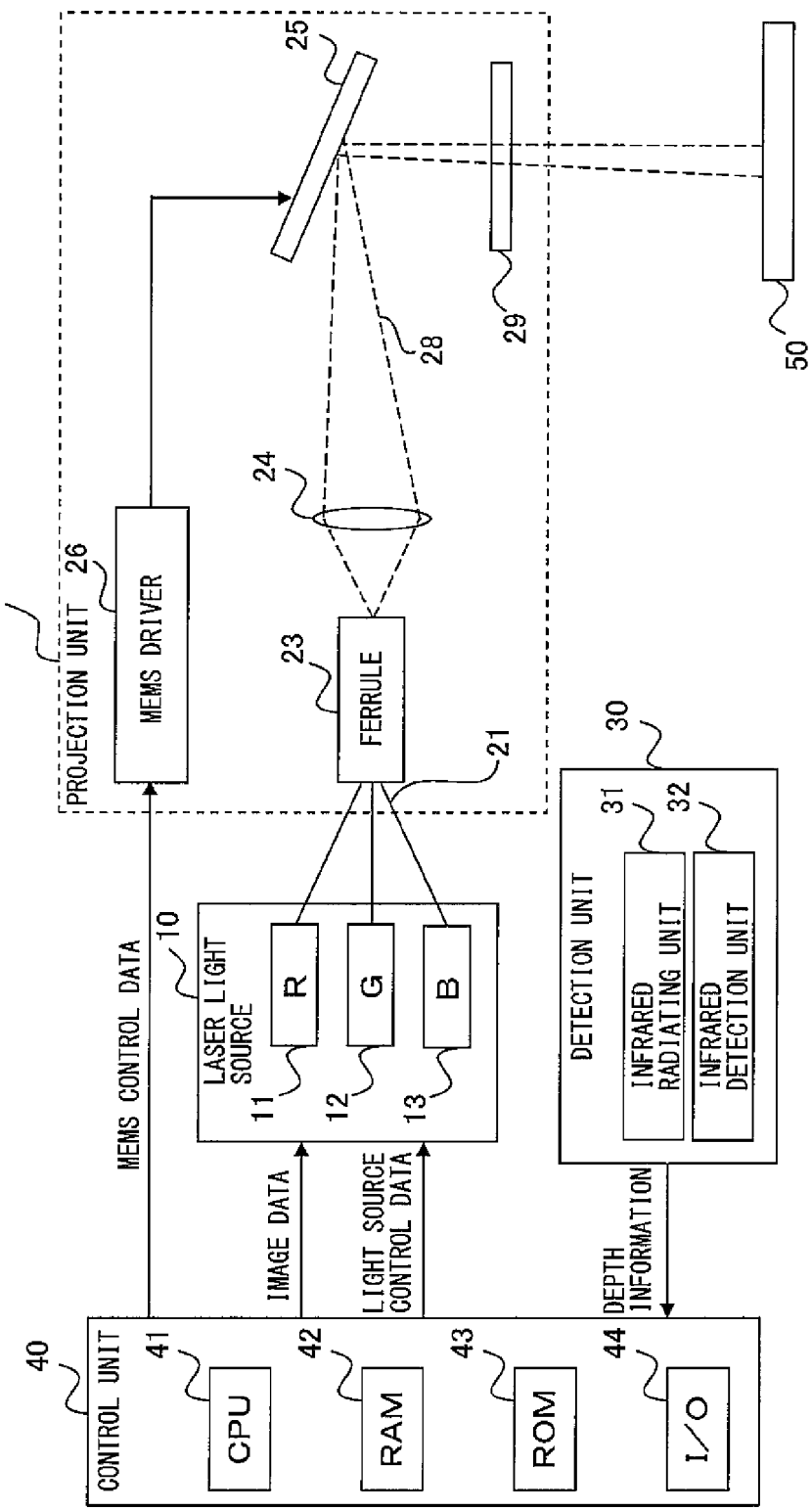
FIG. 1 is a diagram for explaining the general configuration of a laser projector 1.

FIG. 1 is a diagram for explaining the general configuration of a laser projector 1. The laser projector 1 is one example of the projection apparatus, and includes a laser light source 10, a projection unit 20, a detection unit 30, and a control unit 40 as major component elements. The laser projector 1 outputs, from three fibers bundled together by a ferrule, laser lights of different colors emitted from the laser light source 10, and projects an image onto a projection surface 50 by scanning the output lights in a two-dimensional manner via a MEMS (Micro Electro Mechanical System) scanner moving in a swinging fashion.

The laser light source 10 includes laser diodes (LDs) 11, 12, and 13 which emit laser lights of red (R), green (G), and blue (B) colors, respectively. In the laser light source 10, the emission timing and emission intensity of each of the laser diodes (LDs) 11, 12, and 13 are controlled by the control unit 40 in accordance with image data representing the image to be projected.

The projection unit 20 projects the laser lights of different colors, emitted from the laser light source 10, toward the projection surface 50. The projection unit 20 includes a plurality of fibers 21, a ferrule 23, a projection lens 24, a MEMS scanner 25, a MEMS driver 26, and a shield 29.

The plurality of fibers 21 includes dummy fibers not shown, in addition to the fibers used to transmit the laser lights emitted from the laser light source 10. Each fiber is, for example, a single-mode optical fiber. In the following description, the fibers used to transmit the R, G, and B laser lights emitted from the respective laser diodes 11, 12, and 13 will be referred to as the R fiber, the G fiber, and the B fiber, respectively. These fibers may hereinafter be collectively referred to as the RGB fibers, while the dummy fibers will be referred to as the D fibers. The laser projector 1 includes the R, G, and B fibers, one for each color, and a plurality of D fibers.

The ferrule 23 is one example of a fixing device, and fixes the R, G, B, and D fibers in place by bundling their ends on the side opposite from the laser light source 10. The ferrule 23 functions as a fiber bundle combiner that forms a fiber bundle. The RGB laser lights are emitted from the exit end faces of the corresponding fibers 21 which are located at the output end of the ferrule 23.

The projection lens 24 shapes the RGB laser lights emitted from the exit end faces of the respective fibers 21 so that the laser lights will be projected onto the MEMS scanner 25.

The MEMS scanner 25 is one example of a scanning unit which scans the projection surface 50 with the RGB laser lights passed through the projection lens 24 in a two-dimensional manner. The MEMS scanner 25 is driven by the MEMS driver 26 in a rapid, swinging fashion, for example, in the horizontal and vertical directions. In the horizontal direction, the MEMS scanner 25 is resonantly driven, for example, at about 20 kHz, and its scanning angle varies sinusoidally with time. In the vertical direction, the MEMS scanner 25 is driven, for example, at about 60 Hz by forceful sawtooth-like driving, and its scanning angle varies with time in the form of a sawtooth wave.

The MEMS driver 26 drives the MEMS scanner 25 in a rapid, swinging fashion in the horizontal and vertical directions in accordance with control data from the control unit 40. The driving method employed here may be an electrostatic method, an electromagnetic method, a piezoelectric method, or any other suitable method. Further, different driving methods may be employed for the horizontal and vertical scanning directions, respectively.

The shield 29 is a frame member having a rectangular opening (see FIG. 3A), and shields the area surrounding the scanning area of a laser light 28 scanned by the MEMS scanner 25. The laser light 28 passing through the opening of the shield 29 forms an image on the projection surface 50.

The detection unit 30 detects the distance (depth information) between the laser light exit point of the projection unit 20 and the projection surface 50, and includes an infrared radiating unit 31 and an infrared detection unit 32. The infrared radiating unit 31 radiates infrared light into the space where the laser projector 1 is installed. The infrared detection unit 32 is, for example, an infrared camera, and receives reflected light produced by the infrared light radiated from the infrared radiating unit 31 and reflected from an object, floor, wall, or the like located within that space. The detection unit 30 uses, for example, a time-of-flight (TOF) method, and detects the depth information by measuring the time of flight of the light from the time the infrared light is radiated by the infrared radiating unit 31 to the time the reflected light is received by the infrared detection unit 32. Alternatively, the detection unit 30 may use a system of triangulation based on a pseudo-random dot radiation method, such as an M-Array, and passes the depth information to the control unit 40.

The control unit 40 controls the entire operation of the laser projector 1, and includes a CPU 41, a RAM 42, a ROM 43, and an I/O 44. The I/O 44 is an interface for transferring data to and from the projection unit 20 and the detection unit 30. The control unit 40 controls the emission timing of the laser light source 10, as will be described later, in accordance with the image data and the depth information received from the detection unit 30. Further, the control unit 40 controls the projection unit 20 to project the laser light onto the projection surface 50.

The laser projector 1 projects an image by using laser light that can be regarded as an ideal Gaussian beam, and thus has the characteristic wherein, by optimally adjusting the projection angle of the MEMS scanner 25 and the spreading angle of the Gaussian beam, the image can be projected with a good focus on the projection surface 50, regardless of the distance between the projection unit 20 and the projection surface 50 (focus-free characteristic). As a result, a good image can be projected without using the depth information, as long as the image is simply projected on the projection surface, such as a wall or the like.

However, if it is desired to project an image constantly in the same size regardless of the distance between the projection unit 20 and the projection surface 50, the depth information becomes necessary. For example, when detecting the palm of a hand within a predefined space where an image can be projected and projecting an image on the detected palm, the image is projected constantly in the same size, regardless of the distance from the laser projector 1. For this purpose, the distance to the palm of the hand serving as the projection surface is detected, and the size of the image to be projected is changed according to the distance by changing, for example, the emission angle of the laser light from the projection unit 20 so that the image can be projected constantly in the same size on the palm. In such cases, the depth information detected by the detection unit 30 becomes necessary.

Figure 2:
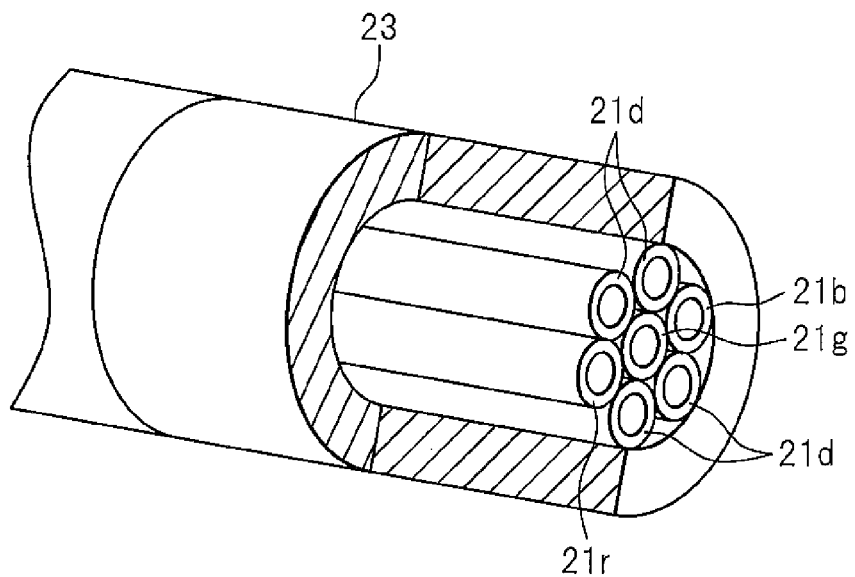
FIGS. 2A to 2C are diagrams for explaining the ferrule 23 and the fiber bundle.
Figure 2:
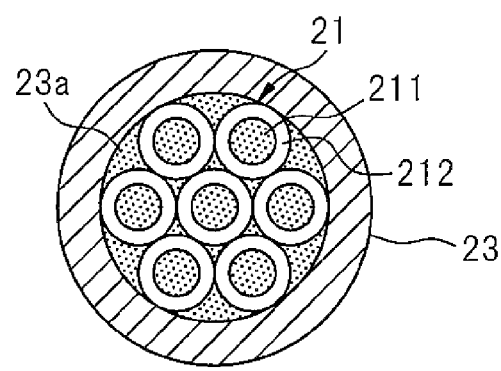
Figure 2:
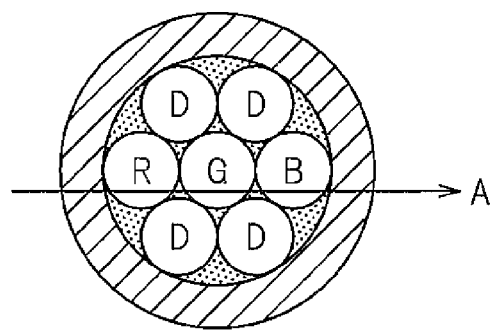

FIGS. 2A to 2C are diagrams for explaining the ferrule 23 and the fiber bundle. FIG. 2A is a partially cutaway perspective view of the ferrule 23. FIG. 2B is a cross-sectional view of the fiber bundle fixed in place by the ferrule 23. FIG. 2C is a diagram for explaining the designations of the fibers shown in FIG. 2B.

The ferrule 23 is formed, for example, in a cylindrical shape from zirconia. The ferrule 23 fixes one R fiber 21*r*, one G fiber 21*g*, one B fiber 21*b*, and four D fibers 21*d*. These seven fibers are held together in a closely packed manner within a cylindrical through-hole 23*a*.

Each fiber 21 has a core 211 and a clad 212 covering the core. The core 211 is formed through the center of the fiber 21 and transmits laser light. A polarization maintaining fiber or a single-mode fiber suitable for a predetermined wavelength can be used as the fiber 21. The clad 212 is formed so as to cover the outer circumference of the core 211, and has a lower refractive index than the core 211. The RGB fibers are each connected, at the end (not shown) opposite from the end shown in FIG. 2A, to a corresponding one of the laser diodes 11, 12, and 13. The RGB laser lights are emitted from the output ends of the corresponding RGB fibers shown in FIG. 2A.

The plurality of fibers 21 are arranged with the G fiber 21*g* at the center and with the other six fibers in a concentric circle around the G fiber 21*g*. Further, the R fiber 21*r*, the G fiber 21*g*, and the B fiber 21*b* are aligned in direction A shown in FIG. 2C across the diameter of the concentric circle. The fibers 21 are substantially equal in diameter, and the distance between any two adjacent cores 211 is also substantially equal. The ferrule 23 fixes the thus configured fiber bundle in place. The ferrule 23 is fixed relative to the laser projector 1. That is, the position of each fiber 21 is fixed for each laser projector (each apparatus).

In this way, in the laser projector 1, rather than combining the lights from the RGB fibers into a single fiber, the plurality of fibers 21 including the RGB fibers are simply bundled together to form a fiber bundle which is then fixed by the ferrule 23. The laser projector 1 thus enhances the efficiency of laser light utilization by suppressing the effects that could occur between the fibers in the case of the fused fiber configuration.

The ferrule 23 may be formed from some other suitable material such as stainless steel. Further, the fiber bundle may be fixed by using a suitable fixing device other than the ferrule 23.

Figure 3:
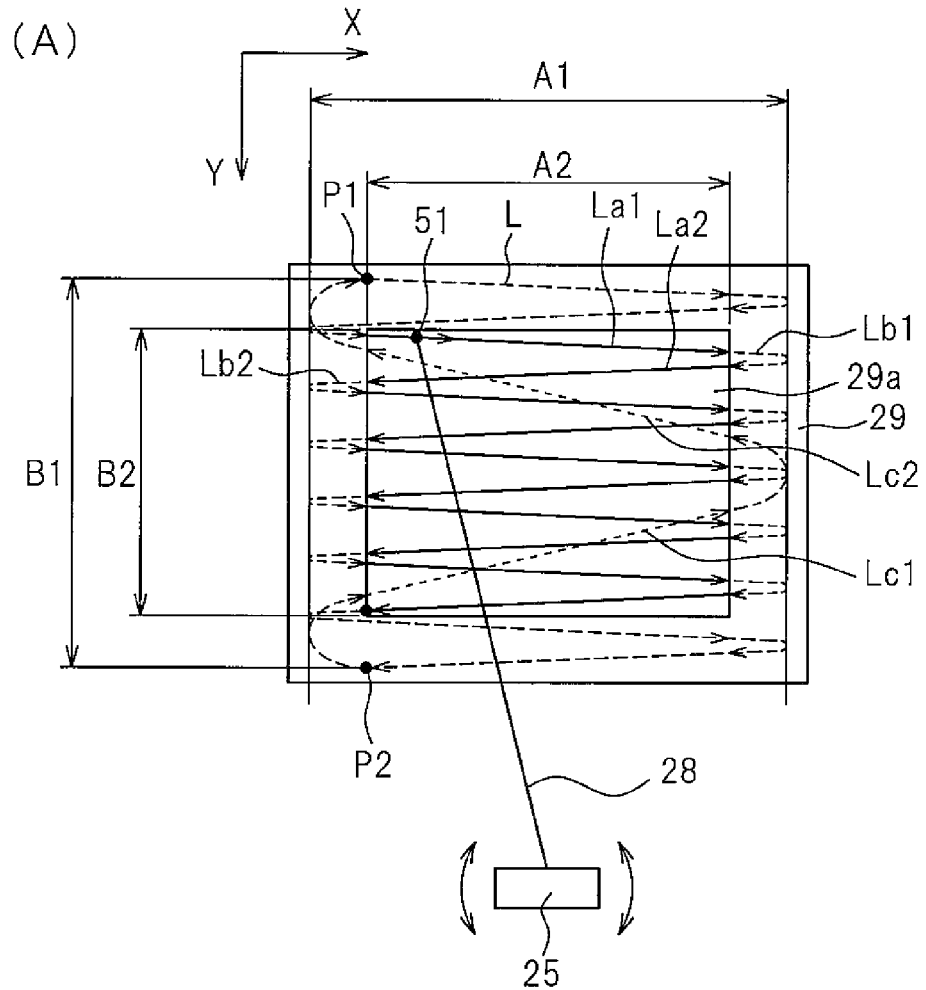
FIGS. 3A and 3B are diagrams for explaining how the laser light 28 is scanned by the MEMS scanner 25.
Figure 3:
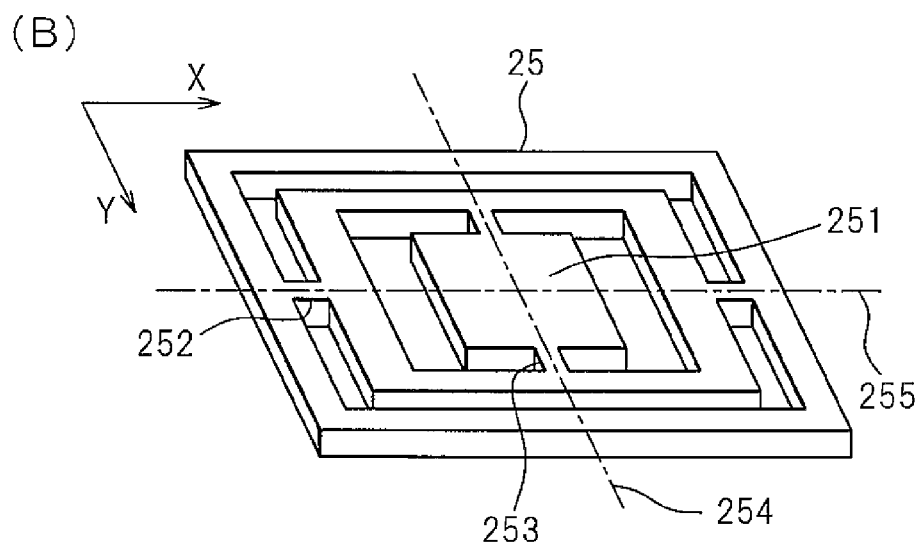

FIGS. 3A and 3B are diagrams for explaining how the laser light 28 is scanned by the MEMS scanner 25. First, FIG. 3A is a diagram for explaining the scanning direction of the laser light 28. As the MEMS scanner 25 is driven in a swinging fashion, a projection point 51 of the laser light 28 moves in arrow directions, describing a sinusoidal locus L as shown by dashed and solid lines. The locus covers the projection surface 50 (see FIG. 1) in a two-dimensional fashion by moving back and forth across the projection surface in substantially horizontal directions. In FIG. 3A, the number of scans is reduced for illustrative purposes.

In FIG. 3A, the horizontal direction is designated as the X direction, and the vertical direction as the Y direction. The laser light 28 is scanned within a rectangular area having a display width A1 in the X direction and a display width B1 in the Y direction. However, the laser light 28 is blocked when it is scanned over the shield 29 (the locus is shown by dashed lines). As a result, the laser light 28 is allowed to reach the projection surface only after passing through an opening 29*a* of the shield 29 having a display width A2 in the X direction and a display width B2 in the Y direction (the locus is shown by solid lines).

The locus L of the projection point 51 starts from point P1 and moves in arrow directions so as to describe a sinusoidal curve as shown by dashed and solid lines. Within the opening 29a, the locus L extends substantially in the X direction as shown, for example, by a locus La1 or La2, and on the shield 29, it describes a curve as shown, for example, by a locus Lb1 or Lb2; this operation is repeated cyclically. When the lowermost point P2 is reached, the locus L moves upward along the sinusoidal curve Lc1, Lc2 shown by fine dashed lines and returns to the starting point P1. This completes the drawing of one raster. By repeating the above series of scans, the laser projector 1 projects images in succession.

FIG. 3B is a schematic diagram of the MEMS scanner 25. The MEMS scanner 25 has a micro mirror 251 as a reflecting face which is supported by torsion bars 252 and 253. As the torsion bar 252 twists, the micro mirror 251 moves in a swinging fashion in the horizontal direction (X direction) with an axis 254 as the center axis. This causes the normal to the reflecting face of the micro mirror 251 to change in the X direction, so that the reflection angle of the laser light incident on the micro mirror 251 changes in the X direction. Likewise, as the torsion bar 253 twists, the micro mirror 251 moves in a swinging fashion in the vertical direction (Y direction) with an axis 255, i.e., the axis orthogonal to the axis 254, as the center axis. This causes the normal to the reflecting face of the micro mirror 251 to change in the Y direction, so that the reflection angle of the laser light incident on the micro mirror 251 changes in the Y direction. In this way, the laser light is scanned in a two-dimensional manner by the MEMS scanner 25.

In the laser projector 1, the ferrule 23 fixes the RGB fibers so that the projection points of the respective colors will be aligned in order along the horizontal scanning direction (X direction in FIG. 3A) of the laser light 28 to correspond with the above scanning process. More specifically, in the laser projector 1, the ferrule 23 fixes the RGB fibers in place by arranging them side by side across the diameter of the concentric circle of the fiber bundle as shown in FIG. 2C, so that the projection points of the RGB lights will be aligned in a straight line on the projection surface. In addition, the ferrule 23 is fixed in position so that the direction in which the RGB fibers are arranged (the direction A in FIG. 2C) coincides with the swinging direction (X direction in FIG. 3B) of the MEMS scanner 25 that causes the reflection angle of the laser light to change in the horizontal direction. This allows the projection points of the RGB lights to be aligned in the X direction on the projection surface. When the direction in which the RGB fibers are arranged is made to coincide with the scanning direction of the laser light 28 in this manner, any positional displacement in the projection point 51 occurring due to the spaced-apart arrangement of the fiber cores can be easily corrected, as will be described later.

The direction in which the RGB fibers are arranged need not necessarily be made to coincide with the swinging direction of the MEMS scanner 25. More specifically, the RGB fibers may be arranged in any suitable direction relative to the swinging direction of the MEMS scanner 25. Further, the fibers 21 in the fiber bundle need not be limited to the arrangement in which the RGB fibers are aligned in a straight line. Furthermore, the number of fibers 21 need not be limited to seven. The arrangement of the fibers 21 in the fiber bundle relative to the swinging direction of the MEMS scanner 25 is known information which is determined for each laser projector 1 (each apparatus). From this information, the location of each projection point 51 on the projection surface 50 can be found.

Now, an explanation will be given of the conditions under which the fiber-bundle type laser projector can superimpose the images of the RGB colors one on top of another. For simplicity, it is assumed and approximated that the lights emitted from the RGB fibers are each a parallel beam of light (collimated light) and are shifted relative to each other only in the horizontal scanning direction. Further, the optical system is approximated by geometrical optics, and it is assumed that the MEMS scanner is located at the focal distance of the projection lens. The core-to-core distance between any two adjacent fibers is designated as d, and the angle that the beam of light from the center fiber makes with the beam of light from its adjacent fiber when the MEMS scanner is at rest at the origin is denoted as the shift angle $\beta$. In this case, the relationship between the core-to-core distance d and the shift angle $\beta$ is given as $$d/f = \tan \beta \quad (1)$$

where f is the focal distance of the projection lens. The equation (1) represents a position/angle transformation.

Figure 4:
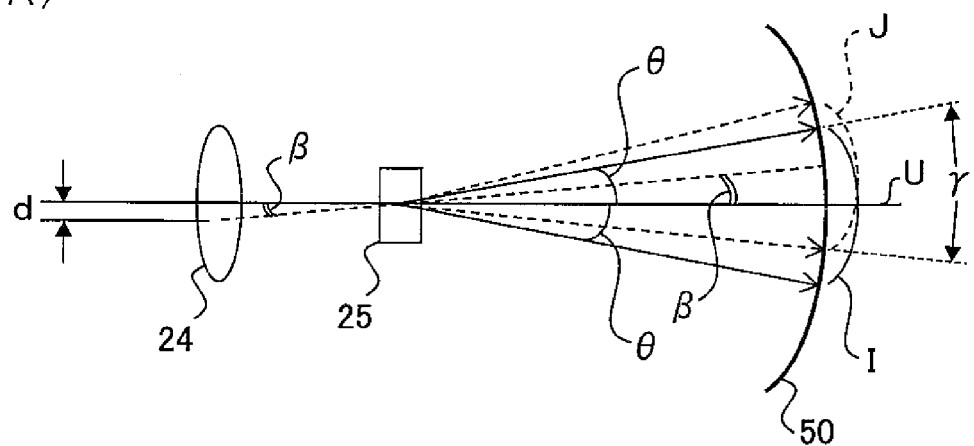
FIGS. 4A and 4B are diagrams for explaining the conditions for the case where image outputs from a plurality of fibers are superimposed one on top of another.
Figure 4:
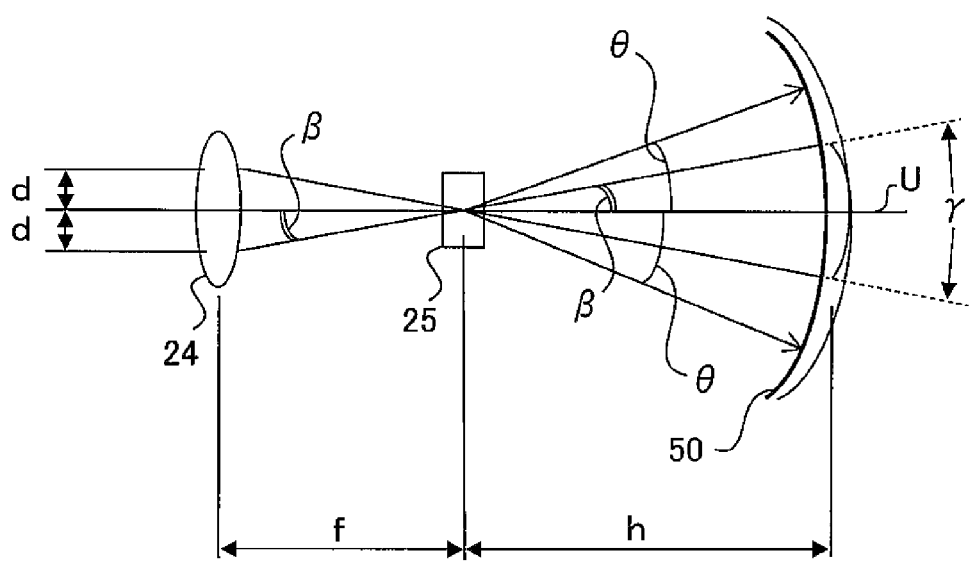

FIGS. 4A and 4B are diagrams for explaining the conditions for the case where image outputs from a plurality of fibers are superimposed one on top of another.

FIG. 4A is a diagram for the case where image outputs from two fibers are superimposed. Consider that an image I by the rays of light (solid lines) from the center fiber is projected on the projection surface 50 with a scanning angle $\theta$ larger than the shift angle $\beta$ ($\theta > \beta$). In this case, an image J by the rays of light (dashed lines) from its adjacent fiber has the same scanning angle $\theta$ and crosses the image I on an optical axis U. From the relationship between the angles shown in FIG. 4A, the superimposing angle $\gamma$ having a positive value and formed with the images I and J superimposed one on top of the other on the projection surface 50 is given as follows.

$$\gamma = 2\theta - \beta \quad (2)$$

FIG. 4B is a diagram for the case where image outputs from three fibers are superimposed. It is assumed that the distances from the center fiber to its adjacent fibers are both equal to d. Since the images from the three fibers cross each other on the optical axis U, $\beta < \theta$. From FIG. 4B, the superimposing angle $\gamma$ is given as follows.

$$\gamma = 2(\theta - \beta) \quad (3)$$

That is, the superimposing angle is narrower by $\beta$ than that obtained by the equation (2) for the case where the image outputs from two fibers are superimposed.

In applications where the laser projector 1 is mounted on a ceiling or the like and, using a fiber bundle containing three RGB fibers, projects an image, for example, on the palm of a hand detected within a predefined space, the laser projector 1 must be designed in consideration of the above equation (3). When projecting an image on a small target such as the palm of a hand, the scanning angle $\theta$ is reduced because the projection distance is long. For this reason, if the shift angle $\beta$ is small, the effective superimposing angle $\gamma$ with which the image can be displayed becomes very small. Then, since the time that can be used for image display in the double scanning angle $2\theta$ of the MEMS scanner 25 is proportional to the superimposing angle $\gamma$, the time during which the image can be displayed becomes short, reducing the efficiency of laser light utilization. For example, when the distance to the projection surface is as short as several tens of centimeters, a practical system can be designed even with a fiber-to-fiber distance d of 80 µm. However, if it is desired to further extend the projection distance, the fiber-to-fiber distance d must be further reduced.

For example, in FIG. 4B, assume that d=80 µm, h=50 cm, and f=2 mm, and that the MEMS scanner 25 is located at the focal distance f of the projection lens 24. In this case, the shift angle β is given as follows.

$$\beta = \tan^{-1}(d/f) = 2.29° \quad (4)$$

The scanning angle $\theta_0$ required to display a circle of diameter l=8 cm from height h=50 cm when d=0 is given as follows.

$$\theta_0 = \tan^{-1}(1/2h) = 4.57° \quad (5)$$

From the equations (3) to (5), the scanning angle θ required to make the superimposing angle $\gamma = 2\theta_0$ equal to 2×4.57=9.14° when d=80 µm is given as follows.

$$\theta = \gamma/2 + \beta = 6.86° \quad (6)$$

Therefore, if there is no displacement in the vertical direction, the effective area ratio within the scanning range is given as $$\theta_0/\theta = 4.57/6.86° = 0.67.$$

In the case of a fused type combiner, the loss may reach 0.5; compared with the loss caused by the combiner, the ratio is given as 0.67/0.5=1.34. That is, in this example, there is a possibility that the fiber bundle type can improve the efficiency by about 34%. Accordingly, in the case of an image whose size is not larger than about 8 cm in diameter, there is a possibility that a brighter display can be achieved with the same light source if the fiber bundle combiner is used.

Next, consider that a 20-inch diagonal image is projected with a scanning angle $\theta_0=12°$. In this case, h=95.6 cm. Since the superimposing angle $\gamma=2\theta_0$ is given as 2×12.0=24.0°, the scanning angle θ for the case where d=80 µm and f=2 mm can be calculated, from $\gamma/2=12.0$ and $\beta=2.29°$, as $$\theta = \gamma/2 + \beta = 14.3°.$$

Hence $$\theta_0/\theta = 12.0/14.3 = 0.84.$$

In applications where the scanning angle θ can be made large, since the time that can be used for image display in the double scanning angle 2θ becomes long, there is a possibility that even at a low output, a much brighter display can be achieved than in the case of the fused type combiner.

The above description is based on the assumption that the MEMS scanner 25 is located at the focal distance of the projection lens 24 and that the RGB lights are converged at the same point on the MEMS scanner 25 and projected onto the projection surface from that point. In practice, however, the RGB lights are not converged exactly at the same point on the MEMS scanner, because of such limitations wherein the actual projection lens is not of an ideal shape and that the MEMS scanner must be placed in the vicinity of the projection lens for design reasons. Accordingly, when actually designing the laser projector, the above-described conditions for image superimposition must be considered by accounting for the above limitations. Even in that case, however, it is expected that, in applications where the scanning angle θ can be made large, a brighter display can be achieved by using the fiber bundle combiner as in the laser projector 1 than would be possible by using the fused type combiner.

Figure 5:
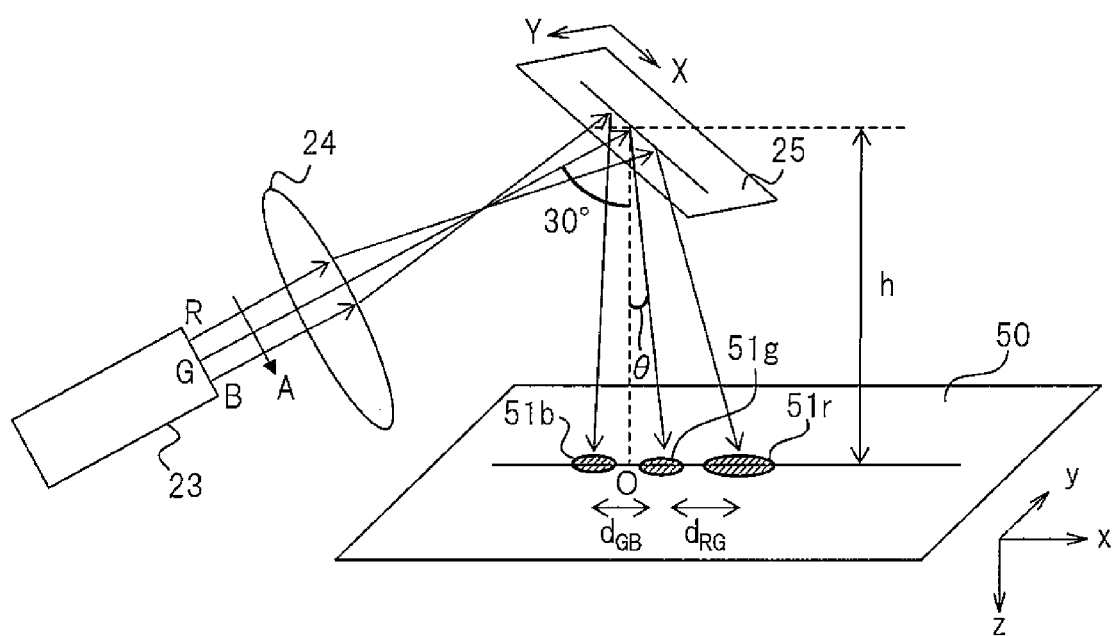
FIG. 5 is a diagram showing a projection optical system in the laser projector 1.

Next, an explanation will be given of the relationship between the distance from the laser light exit point of the projection unit 20 to the projection surface 50 and the amount of positional displacement that occurs between the projection points of the RGB lights on the projection surface 50. FIG. 5 is a diagram showing a projection optical system in the laser projector 1. In FIG. 5, the ferrule 23, the projection lens 24, the MEMS scanner 25, and the projection surface 50, each constituting part of the general configuration in FIG. 1, are shown in enlarged form.

Here, x, y, and z axes are defined as shown, and the horizontal scanning direction on the projection surface 50 by the MEMS scanner 25 is designated as the x direction, and the vertical scanning direction as the y direction. The x and y directions coincide with the X and Y directions, respectively, shown in FIGS. 3A and 3B. Further, the angle that the laser light makes when reflected on the MEMS scanner 25 (the incident angle of the laser light) is assumed to be 30°. The angle between the laser light trained on the projection surface 50 and the perpendicular dropped from the reflecting point on the MEMS scanner 25 to the projection surface 50 is designated as the scanning angle θ. The angle θ is the scanning angle in the horizontal direction. The distance from the reflecting point on the MEMS scanner 25 to the projection surface 50 is denoted by h (hereinafter, referred to as the "height"). Further, the center-to-center distance between a projection point 51g of the green laser light and a projection point 51b of the blue laser light on the projection surface 50 is denoted by $d_{GB}$, while the center-to-center distance between a projection point 51r of the red laser light and the projection point 51g of the green laser light is denoted by $d_{RG}$. These center-to-center distances each represent the amount of positional displacement.

In the projection optical system shown in FIG. 5, consider that the height h is varied from 1 m to 2 m and then to 3 m and an image measuring 8 cm square, regardless of the height h, is formed on the projection surface 50 by projection. The relationship between the height h and the range over which the horizontal scanning angle θ by the MEMS scanner 25 can be changed is defined as follows.

When $h=1$ m, $\theta=-1.66$ to $2.08°$ ($\theta_{max}-\theta_{min}=3.752°$)

When $h=2$ m, $\theta=-1.21$ to $1.42°$ ($\theta_{max}-\theta_{min}=2.644°$)

When $h=3$ m, $\theta=-1.06$ to $1.20°$ ($\theta_{max}-\theta_{min}=2.273°$)

Since the range of the horizontal scanning angle θ by the MEMS scanner 25 must be changed according to the height h as described above, information concerning the height h (the depth information) is necessary in order to project an image constantly in the same size on the projection surface 50, regardless of the height h.

Figure 6:
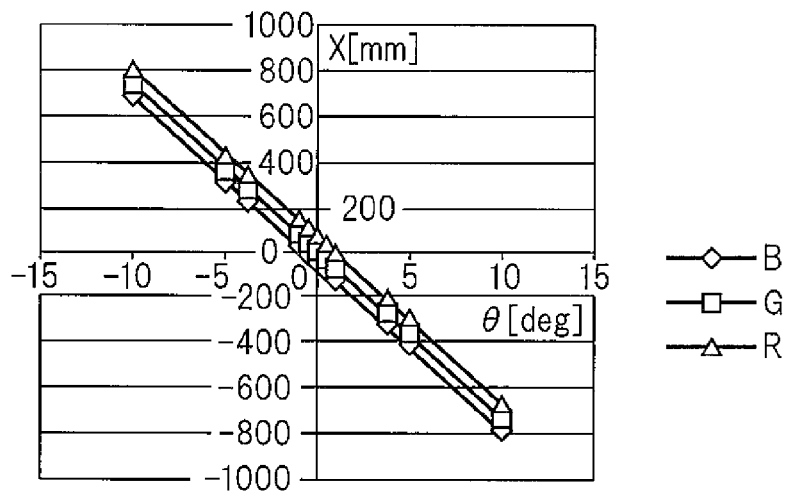
FIGS. 6A to 6C are graphs showing the results of experiments conducted with the projection optical system of FIG. 5.
Figure 6:
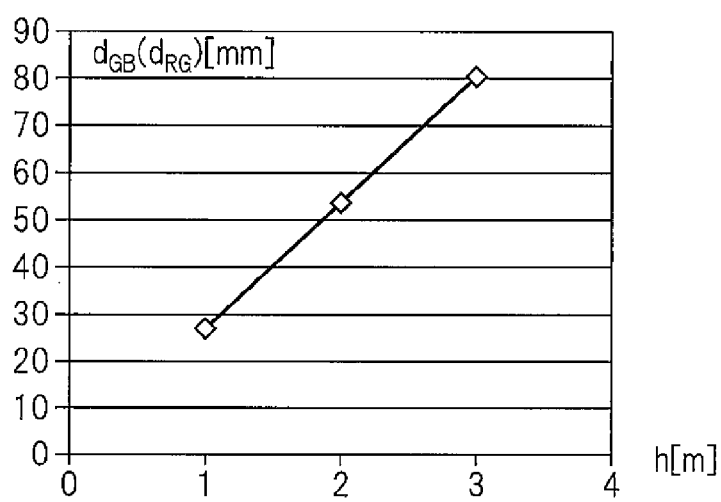
Figure 6:
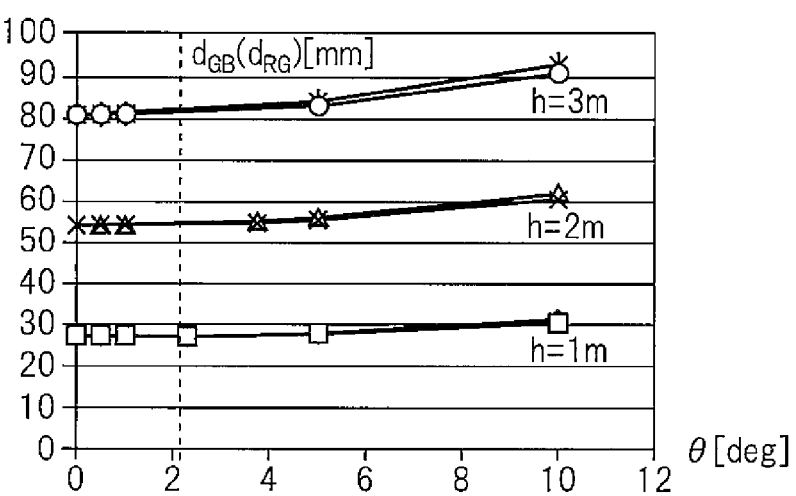
Figure 7:
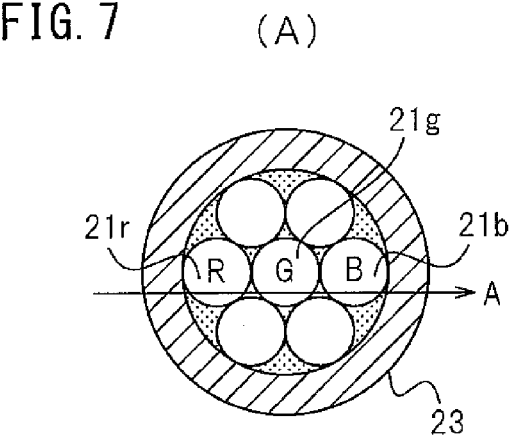
FIGS. 7A and 7B are diagrams for explaining an example of how positional displacement of each projection point is corrected.
Figure 7:
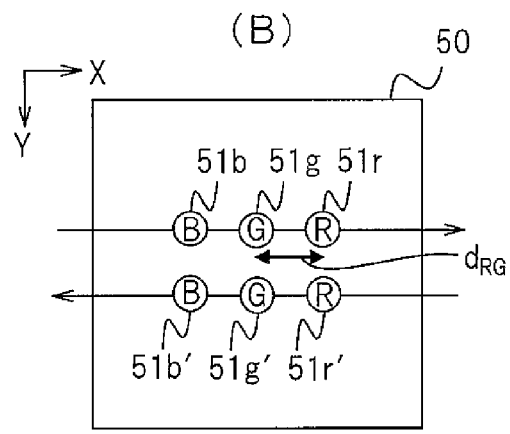
Figure 8:
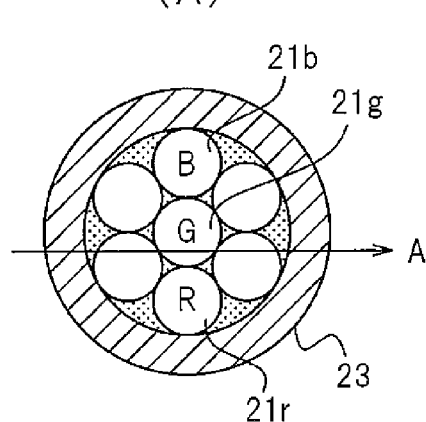
FIGS. 8A and 8B are diagrams for explaining another example of how positional displacement of each projection point is corrected.
Figure 8:
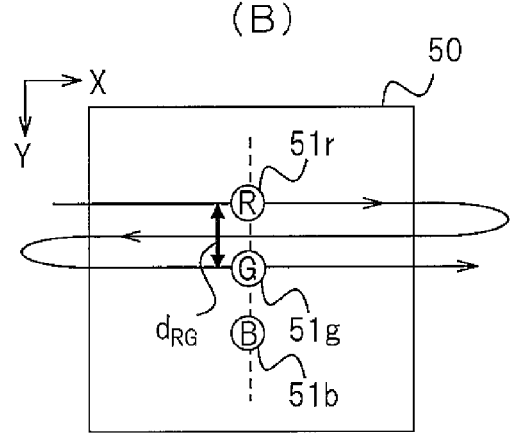
Figure 9:
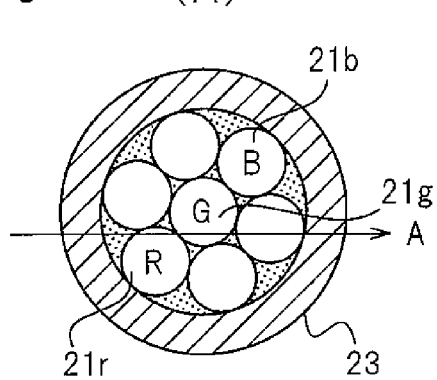
FIGS. 9A and 9B are diagrams for explaining still another example of how positional displacement of each projection point is corrected.
Figure 9:
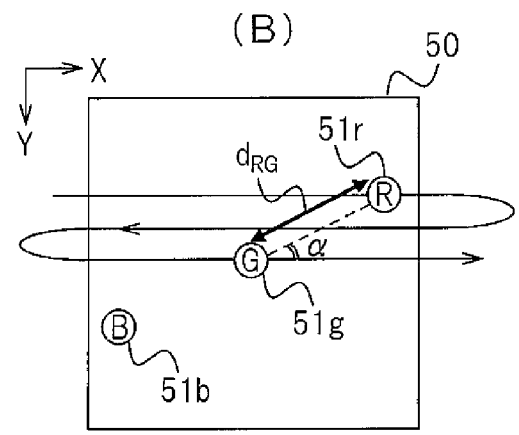

FIGS. 6A to 6C are graphs showing the results of experiments conducted with the projection optical system of FIG. 5. FIG. 6A is a graph showing the relationship between the horizontal scanning angle θ and the location of the projection point of each of the RGB lights in the x direction when h=1 m. Point 0 in FIG. 5 is taken as the origin. It can be seen that at each horizontal scanning angle θ, the location in the x direction is different between the projection points of the RGB lights, which causes positional displacements.

FIG. 6B is a graph showing the relationship between the height h and the amount of positional displacement $d_{GB}$ when the horizontal scanning angle θ by the MEMS scanner 25 is 0°. Although not shown here, the relationship between the height h and the amount of positional displacement $d_{RG}$ is the same as that shown here. From FIG. 6B, it can be seen that the amount of positional displacement $d_{GB}$ (and $d_{RG}$) varies linearly with the height h.

FIG. 6C is a graph showing the relationship between the horizontal scanning angle θ by the MEMS scanner 25 and the amount of positional displacement $d_{GB}$. Although not shown here, the relationship between the horizontal scanning angle θ and the amount of positional displacement $d_{RG}$ is the same as that shown here. From FIG. 6C, it can be seen that the amount of positional displacement $d_{GB}$ (and $d_{RG}$) increases somewhat as the horizontal scanning angle θ increases. It can also be seen that the way the amount of positional displacement spreads differs somewhat, depending on the height h, i.e., the greater the height h, the greater the spreading.

However, according to FIG. 6C, the way the amount of positional displacement spreads is substantially the same within the above-noted range of $θ_{max}$ to $θ_{min}$, whether the height h be 1 m, 2 m, or 3 m. It can be seen that within this range, the amount of positional displacement $d_{GB}$ (and $d_{RG}$) is proportional to the height h. The moving speed of the projection point 51 on the projection surface 50 is also proportional to the height h. Accordingly, when the horizontal scanning angle θ is sufficiently small as when projecting an image in the size of an 8 cm square on the projection surface 1 to 3 meters away (the maximum horizontal scanning angle $θ_{max}$ is about 2.08° indicated by a dashed line in FIG. 6C), if the emission timing of each color is once determined so that the RGB projection points converge at the same point for a given height h, an image free from positional displacements between the projection points can be projected by emitting the laser light of each color with the same emission timing even when the height h changes.

As can also be seen from FIG. 5, the parallel shift of the emission points of the respective laser lights on the entrance side of the projection lens 24 is subjected to a position/angle transformation by the projection lens 24, and thus any positional displacement is transformed into an angular displacement. It can therefore be easily understood that even when the height h changes, if the resulting angular displacement can be corrected by the MEMS scanner 25, any image displacement on the projection surface can be corrected. However, when each of the RGB laser lights is projected and reflected at a point spaced away from the fulcrum of the mirror of the MEMS scanner 25, the displacement also involves translational motion. Further, when the scanning angle is large, since the angle of the mirror of the MEMS scanner 25 varies sinusoidally with time, the displacement has a nonlinear characteristic. In view of these factors, in the general case which also includes the case where the horizontal scanning angle θ is large, the emission timing of each color must be controlled by considering how the amount of positional displacement spreads according to the height h as shown in FIG. 6C.

Next, an explanation will be given of how positional displacement of the projection point of each of the RGB lights is corrected by the control unit 40 shown in FIG. 1. As explained previously, if the RGB fibers are simply bundled together, the projection points of the RGB lights will become displaced relative to each other on the projection surface, since the fiber cores are spaced a certain distance apart from each other, and the projected image will appear blurred. Therefore, in the laser projector 1, the control unit 40 controls the emission timing of the laser light source 10 for each color so as to cancel out positional displacement of the projection point. In this way, the laser projector 1 corrects positional displacement of the projection point in an apparent manner.

FIGS. 7A to 9B are diagrams for explaining three examples of how positional displacement of each projection point is corrected. In these examples, it is assumed that the ferrule 23 is fixed in position so that the direction A defining the arrangement in the fiber bundle coincides with the X direction along which the MEMS scanner 25 scans. Further, in these examples, of the three fibers, the R fiber 21r, the G fiber 21g, and the B fiber 21b, the G fiber 21g is located in the center. Therefore, the following relates to the case in which any positional displacement is corrected by reference to the projection point of G.

FIGS. 7A and 7B are diagrams showing the case where the direction (direction A) along which the RGB fibers are arranged coincides with the horizontal scanning direction (X direction) of the MEMS scanner 25. On the projection surface 50, the RGB projection points 51r, 51g, and 51b are located one behind another in the X direction. If the height h (the distance from the reflecting point on the MEMS scanner 25 to the projection surface 50) is known, the amounts of positional displacements $d_{GB}$ and $d_{RG}$ between the respective projection points can be determined from the relationships shown in FIGS. 6B and 6C. Then, from the moving speed of each projection point for this height h, the emission timing difference Δt for canceling out the corresponding positional displacement can be determined.

However, of the RGB projection points, the point located forward in the scanning direction and the point located backward are reversed each time the scanning direction changes from the +X direction to the −X direction or vice versa. As a result, the sign of the timing difference Δt changes, depending on whether the scanning direction is the leftward direction or the rightward direction. For example, in the case of FIG. 7B, when the scanning direction is the +X direction, the R projection point 51r is located forward of the G projection point 51g in the scanning direction, and the B projection point 51b is located backward in the scanning direction. On the other hand, when the scanning direction is the −X direction, the B projection point 51b' is located forward of the G projection point 51g' in the scanning direction, and the R projection point 51r' is located backward in the scanning direction.

In view of the above, for the R projection point 51r, 51r', Δt>0 (the emission timing is retarded) when the scanning direction is the +X direction, and Δt<(the emission timing is advanced) when the scanning direction is the −X direction. On the other hand, for the B projection point 51b, 51b', Δt<0 (the emission timing is advanced) when the scanning direction is the +X direction, and Δt>0 (the emission timing is retarded) when the scanning direction is the −X direction. In this way, the timing difference Δt is determined for each projection point according to the scanning direction.

FIGS. 8A and 8B are diagrams showing, as a modified example, the case where the RGB fibers are arranged in a direction vertical to the direction A and where the direction along which the RGB fibers are arranged coincides with the vertical scanning direction (Y direction) of the MEMS scanner 25. On the projection surface 50, the RGB projection points 51r, 51g, and 51b are located one above another in the Y direction. The relationships shown in FIGS. 6B and 6C also hold for the case where the projection points are arranged in the vertical scanning direction. Therefore, as in the case of FIG. 7B, the amounts of positional displacements $d_{GB}$ and $d_{RG}$ can be determined from the height h.

If there is a positional displacement in the vertical scanning direction, the number of scanning lines scanned in the X direction between the two displaced points is counted. More specifically, the total number of scanning lines scanned in the X direction of the projected image is denoted by N, and the length of the projected image in the Y direction by $l_y$; then, the number of scanning lines scanned in the X direction when the projection point moves in the Y direction by $d_{RG}$ is given as $(d_{RG}/l_v) \times N$. Therefore, when the scanning time required to traverse the projected image once in the X direction is denoted by $T_h$, the emission timing difference $\Delta t$ is given as $(d_{RG}/l_v) \times N \times T_h$. The same applies for the amount of positional displacement $d_{GB}$.

Then, for the B projection point 51b located forward in the scanning direction, the emission timing is retarded by $\Delta t$ ($\Delta t > 0$) regardless of whether the scanning direction is the +X direction or the −X direction. On the other hand, for the R projection point 51r located backward in the scanning direction, the emission timing is advanced by $|\Delta t|$ ($\Delta t < 0$), regardless of whether the scanning direction is the +X direction or the −X direction.

FIGS. 9A and 9B are diagrams showing, as another modified example, the case where the direction along which the RGB fibers are arranged does not coincide with the scanning direction of the MEMS scanner 25. In this case also, the amounts of positional displacements $d_{GB}$ and $d_{RG}$ can be determined from the height h. For ease of explanation, it is assumed that the R projection point 51r is displaced at an angle $\alpha$ with respect to the X direction by a distance $d_{RG}$ relative to the G projection point 51g. The angle $\alpha$ is a known quantity which is determined by the arrangement of the fibers 21 in the fiber bundle relative to the swinging direction (X direction) of the MEMS scanner 25. This modified example has the characteristic that the spacing of the R and B points relative to the G point in the vertical scanning direction can be adjusted by rotating the fiber bundle about its axis.

Let N denote the total number of scanning lines scanned in the X direction of the projected image, $l_v$ denote the length of the projected image in the Y direction, and $T_h$ denote the scanning time required to traverse the projected image once in the X direction; then, the emission timing difference corresponding to the Y component $d_{RG} \sin \alpha$ of the amount of positional displacement $d_{RG}$ is given as $(d_{RG} \sin \alpha/l_v) \times N \times T_h$. Then, the timing difference is obtained by also taking into account the X component $d_{RG} \cos \alpha$ of the amount of positional displacement $d_{RG}$. More specifically, when the length of the projected image in the X direction is denoted by $l_h$, the timing difference in the X direction is given as $(d_{RG} \cos \alpha/l_h) \times T_h$, and hence the final emission timing difference $\Delta t$ is given as $$(d_{RG} \sin \alpha/l_v) \times N \times T_h - (d_{RG} \cos \alpha/l_h) \times T_h.$$

The same applies for the amount of positional displacement $d_{GB}$.

Then, for the B projection point 51b located forward in the scanning direction, the emission timing is retarded by $\Delta t$ ($\Delta t > 0$), regardless of whether the scanning direction is the +X direction or the −X direction. On the other hand, for the R projection point 51r located backward in the scanning direction, the emission timing is advanced by $|\Delta t|$ ($\Delta t < 0$), regardless of whether the scanning direction is the +X direction or the −X direction.

In particular, when the scanning angle $\theta$ is small, the positional displacement between each projection point can be canceled out by using the above timing difference $\Delta t$ even when the height h changes, because there is a proportional relationship between the height, the amount of positional displacement, and the moving speed of the projection point.

In view of the above, in the laser projector 1, the relationship between the relative position of each projection point and the emission timing difference $\Delta t$ is obtained in advance for various projection point arrangements and stored in the form of a table. More specifically, the relationship between the position relative to the reference point selected from among the RGB projection points and the timing difference $\Delta t$ required to shift the projection point located at the relative position to the reference point is stored in the form of a table. The control unit 40 corrects the emission timing of each laser light by referring to the table. For each relative position, the table stores the timing difference $\Delta t_+$ for the +X scanning direction and the timing difference $\Delta t_-$ for the −X scanning direction.

Figure 10:
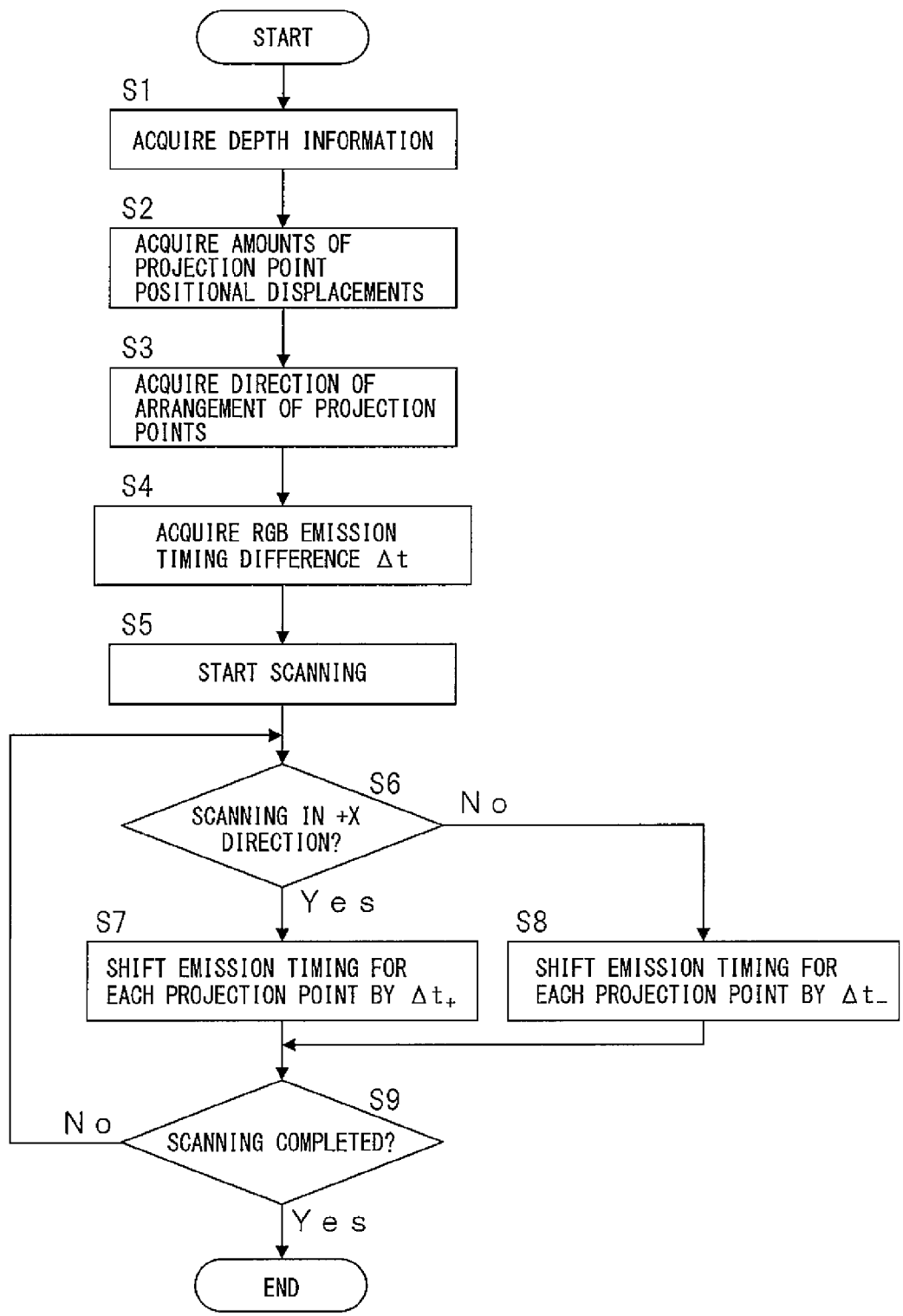
FIG. 10 is a flowchart illustrating an example of a procedure by which the control unit 40 corrects positional displacement of the projection point of each color.

FIG. 10 is a flowchart illustrating an example of a procedure by which the control unit 40 corrects the positional displacement of the projection point of each color. The flowchart of FIG. 10 is executed by the CPU 41 contained in the control unit 40 shown in FIG. 1, in accordance with a program prestored in the ROM 43 contained in the control unit 40.

First, the control unit 40 acquires depth information (height h) that the detection unit 30 detected by radiating infrared light from the infrared radiating unit 31 and receiving the reflected light at the infrared detection unit 32 (S1). Then, based on the relationships shown in FIGS. 6B and 6C, the control unit 40 calculates, from the depth information acquired in step S1, the amounts of positional displacements $d_{GB}$ and $d_{RG}$ of the projection points caused when an image is projected on the projection surface 50 from the current height h (S2). Further, the control unit 40 acquires the direction of arrangement of the projection points from the known information that indicates the arrangement of the fibers 21 in the fiber bundle relative to the swinging direction of the MEMS scanner 25 (S3). Then, by referring to the table constructed in advance as described above, the control unit 40 acquires, from the direction of arrangement of the projection points and the amounts of positional displacements $d_{GB}$ and $d_{RG}$, the RGB emission timing difference $\Delta t$ such that the RGB projection points are brought to the same point (S4).

Next, based on the image data to be projected, the control unit 40 causes the laser light source 10 to emit laser lights and the MEMS scanner 25 to start scanning (S5). Then, the control unit 40 controls the laser light source 10 so as to shift the RGB emission timing by an amount equal to the timing difference $\Delta t$ acquired in step S4. At this time, when scanning the projection surface from left to right in the horizontal direction (the +X direction in FIG. 5) (Yes in S6), the emission timing for each projection point is shifted by an amount equal to the timing difference $\Delta t_+$ obtained for the +X scanning direction (S7). On the other hand, when scanning the projection surface from right to left in the horizontal direction (the −X direction in FIG. 5) (No in S6), the emission timing for each projection point is shifted by an amount equal to the timing difference $\Delta t$ obtained for the −X scanning direction (S8). However, since actually the scanning runs in a diagonally downward direction rather than in a straight horizontal direction, depending on the color (position), control such as to wait until the next scanning timing occurs is also necessary.

If the scanning is not completed yet (S9), the process returns to step S6, and the process from step S6 to step S9 is repeated until the image projection is completed. Then, the control unit 40 terminates the process for correcting positional displacement.

In the above description, of the three RGB points, the G point has been taken as the reference point, and the R and B projection points have been adjusted to align with the G projection point, but instead, either the R or B projection point may be taken as the reference point. Further, the positional displacement of the projection point may be corrected only for two of the RGB colors. Even when the projection points of the RGB colors are not aligned in a straight line, positional displacement can be corrected independently for each color in the same manner as described above.

Further, to expand the color gamut, the laser light source 10 may include a laser light source of some other wavelength, such as Y (yellow), in addition to the R, G, and B light sources. In that case, positional displacement may be corrected for each of the projection points of four or more colors, such as RGBY, in the same manner as described above.

Furthermore, even when an image is projected by a scanning method different from that described with reference to FIG. 3A, positional displacement between the projection points can be corrected in a manner similar to that described above. Specifically, it is necessary only to determine the relationship between the relative position of each projection point, the scanning direction, and the emission timing difference Δt in advance for various projection point arrangements according to the scanning method, and store such a relationship as a table. Then, by referring to the table, the control unit 40 may correct the emission timing for each laser light.

Figure 11:
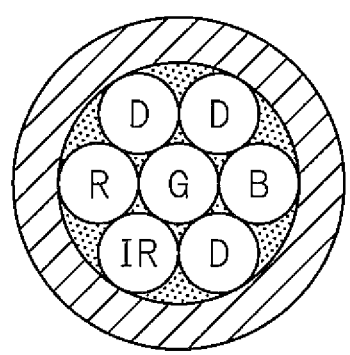
FIG. 11 is a diagram showing a fiber bundle that contains an infrared light radiating fiber in addition to the RGB fibers.

FIG. 11 is a diagram showing a fiber bundle that contains an infrared light radiating fiber in addition to the RGB fibers. The fiber bundle of FIG. 11 is constructed by replacing one of the four D fibers in the fiber bundle of FIG. 2C by an infrared light radiating fiber. A polarization maintaining fiber or a single-mode fiber which operates in a single mode at a given infrared wavelength can be used as the infrared light radiating fiber. This fiber will hereinafter be referred to as the IR fiber. The IR fiber is one example of the infrared light radiating fiber. The IR fiber may be placed at any one of the four positions where the D fibers (fibers other than the RGB fibers) were located in the fiber bundle shown in FIG. 2C. Further, not only one of the D fibers, but also two to four of the D fibers may be replaced by IR fibers.

Figure 12:
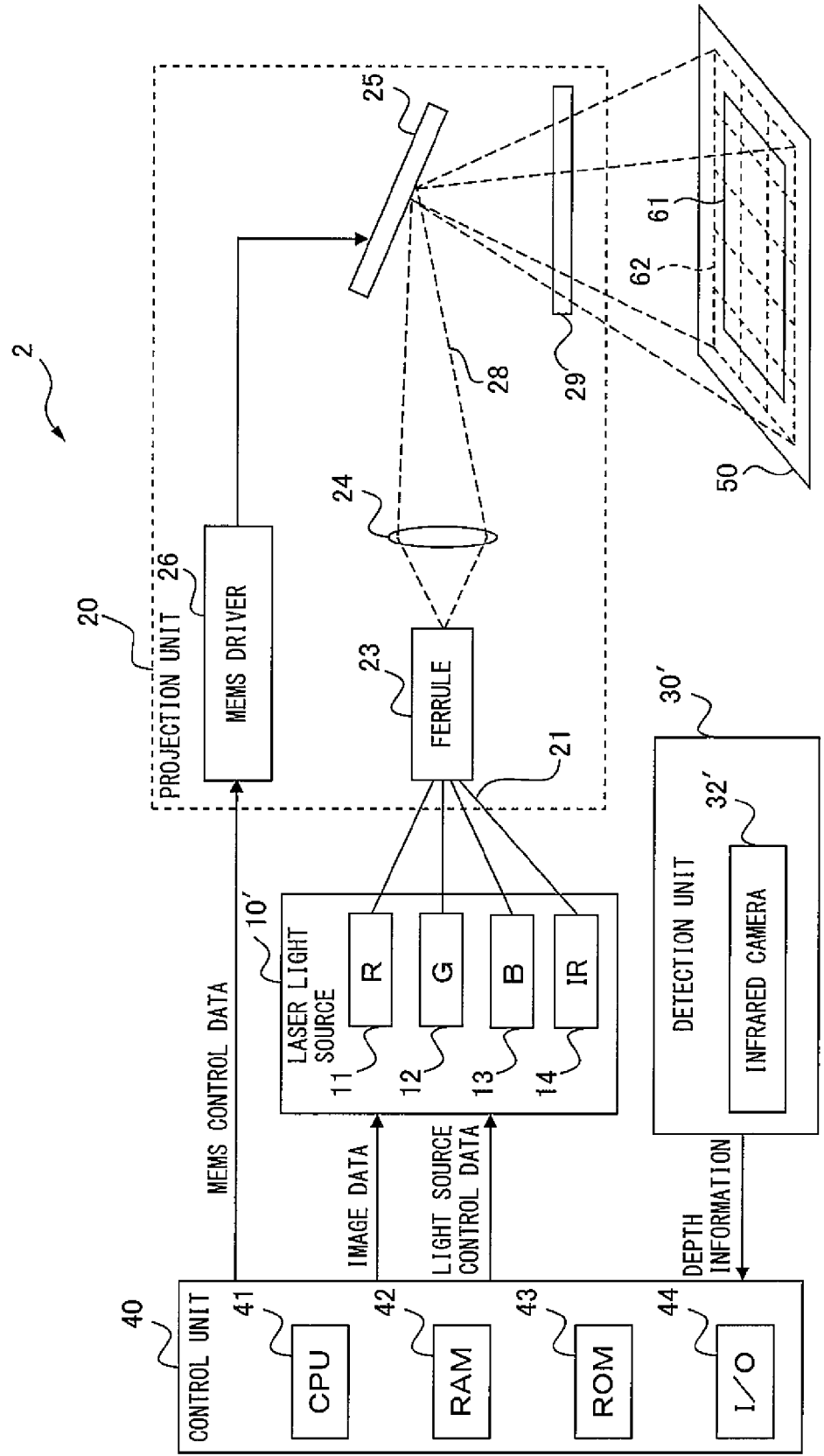
FIG. 12 is a diagram showing schematically the configuration of a laser projector 2 that uses the fiber bundle of FIG. 11.

FIG. 12 is a diagram showing schematically the configuration of a laser projector 2 that uses the fiber bundle of FIG. 11. The laser light source 10' in the laser projector 2 includes a laser diode 14 which emits infrared light (infrared laser light), in addition to the laser diodes 11 to 13 which emit laser lights of R, G, and B, respectively. The laser diode 14 emits, for example, near-infrared (NIR) light as the infrared light. The detection unit 30' in the laser projector 2 does not include the infrared radiating unit, but includes an infrared camera 32' as the infrared detection unit. The infrared camera 32' is, for example, a USB camera, and receives reflected light of the infrared light radiated from the IR fiber. In the laser projector 2, the infrared light generated by the laser diode 14 is radiated from the end portion of the ferrule 23 through the IR fiber before projecting an image or together with the RGB laser lights when projecting an image. The infrared camera 32' receives and detects reflected light of the radiated infrared light. The configuration of the laser projector 2, except for the laser light source 10' and the detection unit 30', is the same as that of the laser projector 1 shown in FIG. 1, and thus the description previously given will not be repeated.

Uses of the infrared light emitted through the IR fiber of the laser projector 2 will be described below with reference to two examples.

The first example is wherein an infrared image is projected on the projection surface 50 by radiating the infrared laser light from the IR fiber, and the projected infrared image is captured by the infrared camera 32' to obtain the depth information of the projection surface 50.

In this case, the laser projector 2 projects a visible light image on the projection surface 50 by scanning the RGB laser lights using the MEMS scanner 25, and also projects an infrared image for depth detecting by scanning the infrared laser light from the IR fiber using the same MEMS scanner 25 so as to superimpose the infrared image on the visible light image. FIG. 12 shows a visible light image 61 and an infrared image 62 projected one over the other on the projection surface 50. Then, the detection unit 30' captures the infrared image for depth detecting by using the infrared camera 32', and acquires the depth information of the projection surface 50 by using a system of triangulation based on a pseudo-random dot projection method, such as an M-Array, for example.

In this way, the scanning angle of the RGB laser lights can be controlled dynamically by the control unit 40 using the acquired depth information when, for example, it is desired to project an image constantly in the same size on the projection surface 50 regardless of the distance to the projection surface 50. This obviates the need to separately provide a depth sensor for acquiring the depth information, and the depth information can be obtained by simultaneously projecting the visible light image and the infrared image using the same MEMS scanner, thus serving to simplify the configuration of the apparatus.

The detection unit 30' may include, in addition to the infrared camera 32', an RGB camera for acquiring color information from the visible light image. It is also possible to construct a projection mapping system by arranging a pair of such laser projectors 2 in a stereoscopic configuration or by arranging many such laser projectors 2 in a suitable configuration.

The second example is wherein image distortion occurring in a visible light image is corrected by using an infrared image projected from the IR fiber onto the projection surface 50 and captured by the infrared camera 32'.

In this case, the laser projector 2 projects a visible light image on the projection surface 50 by scanning the RGB laser lights using the MEMS scanner 25, and also projects an infrared image for distortion correcting by scanning the infrared laser light from the IR fiber using the same MEMS scanner 25 so as to superimpose the infrared image on the visible light image. The infrared image for distortion correcting is, for example, an image of a checkerboard pattern. The infrared camera 32' captures the infrared image for distortion correcting in real time. When the projection surface 50 is a plane surface, the detection unit 30 compares the captured pattern for distortion correcting with a known projected pattern, and detects image distortion caused by geometric variations on the MEMS scanner 25 or image distortion caused by variations in resonant frequency due to temperature variations of the MEMS scanner 25. Then, based on the detected image distortion data, the control unit 40 corrects the RGB image data so as to cancel out the image distortion (feedback correction).

By constantly monitoring the infrared image in this way, the laser projector 2 can reduce image distortion caused, for example, by temperature variations of the MEMS. Even when the projection surface 50 is not a plane surface, if its surface geometry is known, image distortion can be detected by calculation, and a correction can be applied to cancel out the image distortion.

Instead of the pattern for distortion correcting such as a checkerboard pattern, another pattern such as random dots may be projected so as to be superimposed on the visible light image by using the infrared laser light from the IR fiber. In this case, depth information can be obtained by triangulation using the infrared camera 32'; when the projection surface 50 is a plane surface, the deviation of the apparent depth information from the plane surface has correlation with image distortion attributable to the MEMS scanner 25. If the scanning timing of the infrared laser light is corrected so as to bring the deviation of the apparent depth information from the plane surface closer to 0, image distortion data can be obtained; therefore, the RGB image data may be corrected by using the obtained data.

Further, the control unit 40 may compensate for temperature variations of the MEMS scanner 25 by adjusting the amount of RGB laser lights and the amount of infrared laser light. In this case, the control unit 40 controls the laser light source 10' so that the sum of the integrated lighting time of the laser diode 14 and the integrated lighting time of the laser diodes 11 to 13 is substantially maintained at a constant value. The integrated lighting time is the length of time corresponding to the amount of heat generated on the surface of the MEMS scanner 25. Since the amount of heat generated on the surface of the MEMS scanner 25 is equalized by this control, variation of the resonant frequency that occurs due to temperature variations of the MEMS scanner 25 can be held within a limited range, making it easier to correct image distortion.

When correcting the projected image by acquiring the color information or geometric information of the projection surface by using, for example, a USB camera instead of the infrared camera 32', if there is any external light such as room lighting (environmental or ambient light), the contrast of the projected image may become so low that the projected image cannot be recognized by the camera. For example, if the color of the object cannot be measured accurately, it becomes difficult to correct the color of the projected image by using the results of the measurement. In such cases, it is recommended that a band-pass filter (BPF) which only transmits light within the wavelength band of the RGB laser lights and infrared laser light be placed in front of a color-filtered USB camera in order to reduce the effects of the external light.

Usually, the appearance, such as color, of an object varies due to the effects of ambient light. In particular, if the infrared image is acquired under illumination of a black body radiator such as an incandescent lamp or sunshine, the surface geometry may become difficult to measure, since the amount of noise other than the infrared wavelength of interest is large. However, if a BPF is used that has a spectral/wavelength selective characteristic which matches the wavelength of the laser light source as a monochromatic light source, the SN ratio for the wavelength of interest in the captured image can be enhanced. Thus, it becomes possible to accurately measure the spectral characteristics for the wavelengths of the RGB lights and infrared light by minimizing the effects of the external light. Unless the object is a specularly reflective surface or a wavelength selective surface such as a Bragg reflector, color correction can be made, based on the measured spectral characteristics of the RGB lights and infrared light, so as to optimize, for example, the color balance of the captured image.

Using a BPF, the effects of intense external light such as a fluorescent lamp can be reduced, and the contrast ratio (SN ratio) when viewed through a camera improves. Therefore, even a projected image with a low luminance level can be captured by a camera. As a result, it becomes possible to recognize any pattern or projection point displacement, for example, on a personal computer, and thus the accuracy of the depth information can be enhanced if pixel shifting or pattern detection is automatically performed. The transmittance of the BPF may somewhat differ for each peak of the RGB, but in that case, by projecting an image after correcting the luminance value of each color according to the transmittance ratio based on the spectral characteristic data of the BPF acquired in advance, it also becomes possible to correct the color of the projected image.

Rather than placing a BPF in front of the USB camera, eyeglasses incorporating the function of a BPF may be used; then, the user wearing the eyeglasses can view a projected image with a low luminance level, even in an intense external light environment.

The laser light source is a narrow-bandwidth light source having RGB and NIR laser diodes (for example, B: 460 nm, G: 520 nm, R: 637 nm, and NIR: 830 nm); on the other hand, the ambient light that can cause disturbance is, in many cases, a light having a wide spectral range. If a BPF is placed in front of a camera having RGB color filters, each of the RGB pixels of the camera will have a sensitivity equal to the product of the spectral characteristic of the camera and the spectral characteristic of the BPF. When only the pass band of the BPF filter is considered, since external disturbing light has a wide spectral range that can be regarded as white noise, the amount of external disturbing light detected at each of the RGB pixels decreases. On the other hand, in the case of laser light, since the energy is concentrated within a narrow spectral range that can almost be regarded as a delta function, the energy passes through the BPF with little attenuation. As a result, for the laser light, an output is obtained that conforms to an RGB response curve of each of the RGB pixels.

Since the laser light source and the camera are arranged so as to be able to perform triangulation, if the near-infrared light is projected, for example, as an M-array pattern, the laser projector 2 can be used as a depth sensor. Furthermore, when a BPF is placed in front of the camera, the camera is little affected by the ambient light; as a result, the spectral reflectance at the wavelength of the RGB light can be obtained by comparing the intensity of the light obtained by the camera with the intensity of the projected RGB light. Accordingly, the spectral reflectance of the surface of the object on which the laser light is projected can be measured without being affected by ambient lighting.

In the laser projector 2, since the depth information and color information can be obtained in near real time, as described above, the RGB light to be projected can be adaptively adjusted, for example, according to the surface geometry and reflectance of the projection surface. This offers the effect wherein, although the object is not a self-emitting object, the object can be made to appear as if it were always illuminating with the same pattern or same color, even if the orientation is varied, and it thus becomes possible to construct a system that facilitates automation of the projection mapping.

In each of the laser projectors 1 and 2, the responses (reflectance and pattern) of the RGB lights and near-infrared light on the surface of the object on which an image is projected can be simultaneously acquired using a single RGB camera. The following describes how the RGB lights and the near-infrared light can be separated.

The RGB lights can be separated by the camera using pixels having the respective color filters. On the other hand, for the near-infrared light, the RGB pixels of the camera have substantially the same sensitivity; therefore, when the near-infrared light is turned on and off, the changes are detected in the same proportions by the RGB pixels. Actually, adjustments need to be made in advance for sensitivity because, depending on the camera used, the sensitivity to the near-infrared light more or less varies among the RGB pixels, but it is assumed for simplicity that the sensitivity to the near-infrared light is the same for all the RGB pixels. It is also assumed that the background noise due to the ambient light is small enough that it can be disregarded.

Further, it is assumed that the light intensities of the RGB pixels, detected by the camera, are (R, G, B) when the near-infrared light is turned off, and increase by ΔR, ΔG, and ΔB, respectively, when the near-infrared light is turned on. However, it is assumed that the output of each of the RGB pixels is not saturated. From the above assumptions, since the sensitivity to the near-infrared light is the same for all the RGB pixels, it follows that ΔR=ΔG=ΔB=ΔNIR, where ΔNIR is the amount by which the light intensity increases due to the near-infrared light. Accordingly, the difference image (intensity) obtained by turning the near-infrared light on and off is the infrared image. The near-infrared light is invisible to the human eye; therefore, by turning the near-infrared light on and off repeatedly every few frames, for example, the RGB lights and the near-infrared light can be separated from the RGB image without affecting the appearance of the projected image.

In many cases, structured light is used as the near-infrared light when detecting the depth information. One example is the projection of light in an M-array pattern. In this case, since the near-infrared light takes one or the other of the ON and OFF values, a negative/positive reversed pattern can be projected, for example, for every few frames. By performing a summation between the camera images obtained by superimposing the RGB lights on the negative/positive reversed near-infrared light for the same pattern, the near-infrared light pattern can be erased. Similarly, by performing a subtraction between the camera images obtained by superimposing the RGB lights on the negative/positive reversed near-infrared light for the same pattern, it also becomes possible to erase the RGB light pattern.

Figure 13:
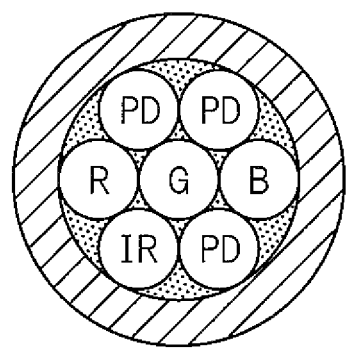
FIG. 13 is a diagram showing another example of a fiber bundle.

FIG. 13 is a diagram showing another example of a fiber bundle. The fiber bundle of FIG. 13 is constructed by replacing one of the four D fibers in the fiber bundle of FIG. 2C by an infrared light radiating fiber and each of the other three by a fiber into which the infrared light radiated from the IR fiber and reflected on the projection surface is input. This latter fiber will hereinafter be referred to as the PD fiber. The PD fiber is one example of an infrared light receiving fiber. A single-mode fiber which operates in a single mode at a given wavelength of the projected infrared light can be used as the PD fiber. However, there are many applications where only the amount of light is important. In that case, a multimode fiber having a large core diameter may be used. In the modified example shown here, a photodiode (PD) (not shown) is provided at the end of the PD fiber opposite from the ferrule 23. Of the infrared light rays reflected by the projection surface, only the reflected light rays entering within a solid angle corresponding to the size of the MEMS scanner 25 enter the respective PD fibers and are detected by their photodiodes.

In the case of FIG. 13, the depth information is detected by receiving through the three PD fibers the reflections of the infrared light radiated from the IR fiber. That is, the depth information is detected, not by the separately provided detection unit 30', but by the IR fiber and PD fibers held fixedly within the ferrule 23 together with the RGB fibers. When the IR fiber and PD fibers for detecting the depth information are also bundled by the ferrule 23 together with the RGB fibers as described above, the separately provided detection unit 30' can be omitted, which serves to further reduce the size of the laser projector.

Not only the above fibers but also a fiber equipped with a visible PD for color detecting may also be included in the bundle. Further, the bundled fibers including those other than the RGB fibers may be replaced by multimode fibers. Even when using multimode fibers, the emission timing can be corrected in the same manner as in the fiber bundle described with reference to FIG. 7A to 10.

The light to be projected from the projection unit 20 may include not only visible light and infrared light, but also ultraviolet light. If an ultraviolet light radiating fiber is bundled by the ferrule 23 together with the RGB fibers and IR fiber, the laser projector can be used as a projection-type exposure apparatus. In this case, an object such as a UV curable resin can be exposed to ultraviolet light while measuring its surface geometry by the infrared light.

Figure 14:
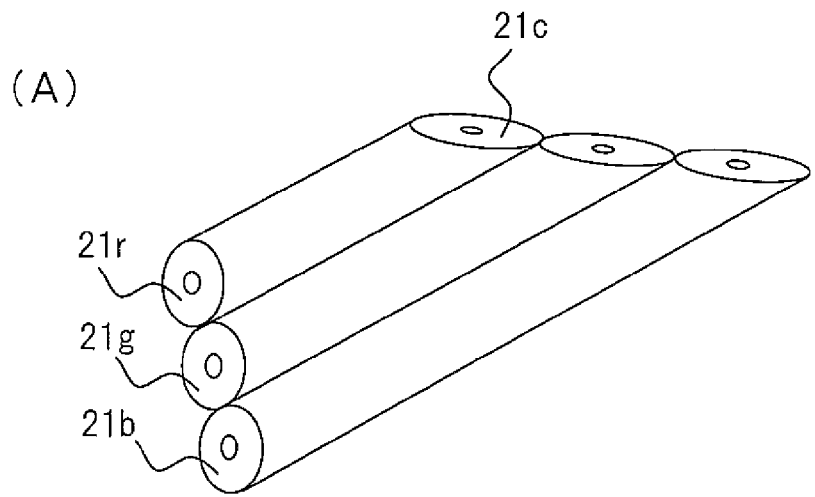
FIGS. 14A to 14C are diagrams for explaining a modified example in which the exit end face of each fiber 21 is cut at an oblique angle.
Figure 14:
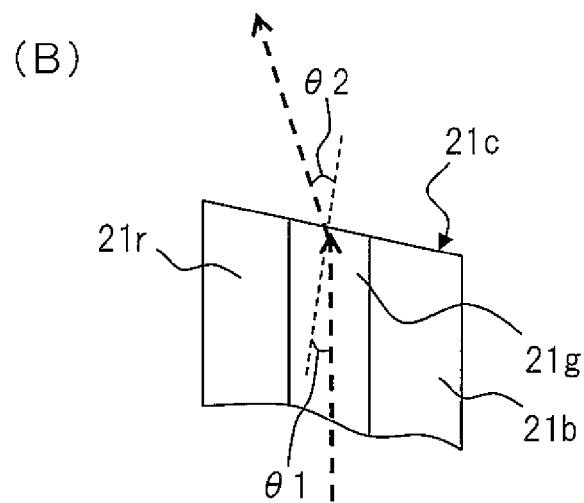
Figure 14:
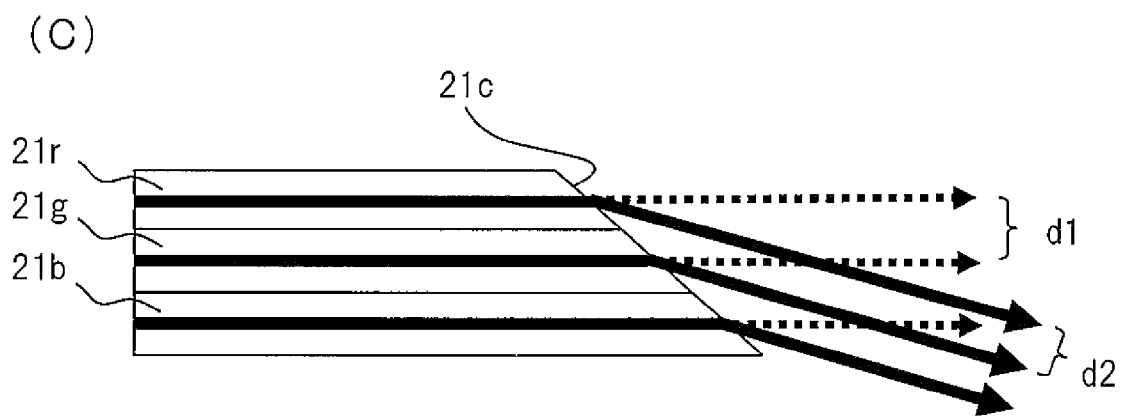

FIGS. 14A to 14C are diagrams for explaining a modified example in which the exit end face of each fiber 21 is cut at an oblique angle. Of the plurality of fibers 21, an exit end face 21c of each of the R, G, and B fibers 21r, 21g, and 21b may be cut at an oblique angle as shown in FIG. 14A. Then, as shown in FIG. 14B, the laser light strikes the exit end face at an incident angle $\theta_1$, and is refracted at a refraction angle $\theta_2$ greater than the angle $\theta_1$ when it is emitted into air whose refractive index is smaller than that of the core. The refraction angle $\theta_2$ needs to be set smaller than 90°. This is also required in order to prevent total internal reflection at the exit end face. As a result, as shown in FIG. 14C, when the fiber ends are thus cut, the beam spacing $d_2$ of the RGB laser lights becomes smaller than the beam spacing $d_1$ that would be the case if the fiber ends were not cut. More specifically, when the exit end faces 21c are cut at an oblique angle, the laser light flux becomes smaller in diameter and is focused as a smaller spot, which serves to further enhance the resolution of the projected image.

FIG. 15 is a diagram for explaining a preferable cutting direction of the exit end faces. As shown in FIG. 15, "cut 1" refers to a case in which the RGB fibers are cut at an oblique angle along a plane surface perpendicular to a plane including the aligned RGB fibers so that the R fiber end is closer to the projection lens 24 than the B fiber end, and "cut 2" refers to a case in which the RGB fibers are cut at an oblique angle so that the B fiber end is closer to the projection lens 24 than the R fiber end. It is assumed that the cutting angle of each fiber 21 is the same as the incident angle θ1 in FIG. 14B, and that the cutting angles in cut 1 and cut 2 are the same.

The relationship between the cutting angle (incident angle) θ1, the refraction angle θ2, the beam spacing d1 before the cutting, and the beam spacing d2 after the cutting is d2=(d1/cos θ1)×cos θ2. Therefore, when θ1=8°, d2≈79.08 μm, and when θ1=20°, d2≈73.64 μm. If the cutting angle is small such as 8°, the difference between d1 and d2 is as small as about 1 μm. Therefore, under the condition that the cutting angle is relatively large 20°, the RGB projection points on the projection surface in the projection optical system shown in FIG. 5 are compared between cut 1 and cut 2. The height h is set at 3 m.

Further, x, y, and z axes are defined as shown in FIG. 15, and it is assumed that the projecting positions of R and B after the cutting are shifted relative to the projecting position of G by the following amount:

cut 1: R is y=d2, z=d2 tan θ1, and B is
    y=−d2, z=−d2 tan θ1 cut 2: R is y=d2, z=−d2 tan θ1, and B is
    y=−d2, z=d2 tan θ1, where the projecting position of G is taken as the origin. Before the cutting, the pattern of the projection points is a perfect circle; however, after the cutting, it is an elliptic having a longer axis in the y direction. Therefore, it is assumed that as the laser light, a distribution having a mode field diameter (MFD) of x=3.5 µm and y=3.5 µm×1.5 moves in the z direction. The MFD without cutting is set at 3.5 µm.

Under these conditions, the sizes of the obtained projection points are as follows.

In the case of no cutting,
R . . . elliptic pattern with y=6.6 mm, z=4.0 mm
G . . . perfect-circle pattern with a diameter of 3.8
B . . . elliptic pattern with z=3.6 mm, y=3.7 mm In the case of cut 1, in the order of the horizontal scanning direction and vertical scanning direction of the MEMS scanner 25,
R . . . 14.2 mm, 16.39 mm
G . . . 5.34 mm, 3.65 mm
B . . . 7.8 mm, 7.9 mm In the case of cut 2, in the order of the horizontal scanning direction and vertical scanning direction of the MEMS scanner 25,
R . . . 6.6 mm, 7.8 mm
G . . . 5.34 mm, 3.65 mm
B . . . 7.4 mm, 11.2 mm From these results, it can be seen that in the case of cut 2, the sizes of the RGB projection points are smaller than in the case of cut 1. In particular, of the three RGB points, the size of the R projection point is smaller. Accordingly, the cutting direction of the exit end faces in the case of cut 2 is preferable to that of cut 1.

As has been described above, in the laser projectors 1 and 2, the RGB fibers are bundled together to form a fiber bundle, and thereby the laser projectors 1 and 2 suppresses crosstalk, etc., that may occur between the fibers, and enhances the efficiency of laser light utilization. Further, in the laser projectors 1 and 2, the control unit 40 changes the projecting positions and the emission timing of RGB laser lights for each color. In this way, any positional displacement in the projection point occurring due to the spaced-apart arrangement of the fiber cores can be corrected. Furthermore, in the laser projectors 1 and 2, the direction in which the RGB fibers fixed by the ferrule 23 is made to coincide with the scanning direction of the MEMS scanner 25. In this way, positional displacement between each projection point can be eliminated by simply shifting the RGB emission timing. In addition, by bundling the RGB fibers and the IR fiber with the ferrule 23, projecting a visible light image and an infrared image one over the other, and capturing the images with an infrared camera, etc., additional information such as image distortion or depth information can be detected while projecting a visible light image.

REFERENCE SIGNS LIST 1, 2 laser projector
10, 10' laser light source
20 projection unit
21 fiber
23 ferrule
24 projection lens
25 MEMS scanner
26 MEMS driver
30, 30' detection unit
31 infrared radiating unit
32 infrared detection unit
32' infrared camera
40 control unit
50 projection surface

What is claimed is:

1. A laser projection apparatus with bundled fibers comprising:
    a laser light source which emits infrared laser light, and red, green, and blue laser lights;
    a fixing device which fixes an exit end portion of an infrared light radiating fiber used to transmit the infrared laser light and exit end portions of colored light radiating fibers used to transmit the red, green, and blue laser lights, respectively;
    a scanning unit which projects an image on a projection surface by scanning the projection surface with the red, green, and blue laser lights emitted from the exit end portions of the colored light radiating fibers without combining the red, green, and blue laser lights with each other;
    a detection unit which detects a reflected light of the infrared laser light emitted from the exit end portion of the infrared light radiating fiber; and
    a control unit which controls emission of the red, green, and blue laser lights from the laser light source, based on information detected by the detection unit, so as to correct positional displacement occurring between projection points of the red, green, and blue laser lights on the projection surface,
    wherein the control unit shifts emission timings of the red, green, and blue laser lights with respect to each other, based on an amount of positional displacement occurring between projection points of the red, green, and blue laser lights on the projection surface due to a positional relationship between the colored light radiating fibers fixed by the fixing device.

2. The laser projection apparatus with bundled fibers according to claim 1, wherein the detection unit detects depth information which indicates a distance from the exit end portions of the colored light radiating fibers to the projection surface, and the control unit controls the emission based on the depth information.

3. The laser projection apparatus with bundled fibers according to claim 1, wherein the fixing device fixes the exit end portions of the colored light radiating fibers so that projection points of the red, green, and blue laser lights will be aligned along a scanning direction of the scanning unit.

4. The laser projection apparatus with bundled fibers according to claim 1, wherein the fixing device fixes the colored light radiating fibers whose exit end faces are inclined at an angle with respect to a plane perpendicular to a longitudinal direction, and the scanning unit scans the projection surface with the laser lights emitted from the colored light radiating fibers in a direction inclined at an angle with respect to the longitudinal direction.

* * * * *